United States Patent [19]

Bae et al.

[11] Patent Number: 4,782,170

[45] Date of Patent: Nov. 1, 1988

[54] LIQUID POLYVINYL CHLORIDE RESIN STABILIZER SYSTEMS BASED ON COMPLEXES OF ORGANIC TRIPHOSPHITES WITH ZINC CHLORIDE

[75] Inventors: Kook J. Bae, East Northport, N.Y.; Michael Fisch, Wayne; Otto Loeffler, Woodbridge, both of N.J.

[73] Assignee: Argus Chemical Corporation, Brooklyn, N.Y.

[21] Appl. No.: 862,882

[22] Filed: May 13, 1986

[51] Int. Cl.$^4$ .............................................. C07F 3/06
[52] U.S. Cl. ...................................... 556/13; 524/327; 252/383; 252/400.23
[58] Field of Search ............. 556/13; 252/383, 400.23; 524/327

[56] References Cited

U.S. PATENT DOCUMENTS

| | | | |
|---|---|---|---|
| 2,945,872 | 7/1960 | Birum | 556/13 |
| 2,951,052 | 8/1960 | Darby | 524/327 X |
| 3,218,342 | 11/1965 | Kerschner | 556/13 |
| 3,219,605 | 11/1965 | Klemchuk | 556/13 X |
| 3,412,118 | 11/1968 | Kujawa et al. | 556/13 |
| 3,428,597 | 2/1969 | Dikötter et al. | 556/13 X |
| 3,943,081 | 3/1976 | Brook | 524/327 |
| 4,159,973 | 7/1979 | Hoch et al. | 524/327 X |
| 4,178,282 | 12/1979 | Bae | 524/327 |
| 4,661,544 | 4/1987 | Quinn | 524/327 X |

OTHER PUBLICATIONS

Chemical Abstracts 66 29613a (1967).
Chemical Abstracts 87 6993u (1977).
Chemical Abstracts 86 73750e (1977).
Chemical Abstracts 81 51773j (1974).

Primary Examiner—Paul F. Shaver

[57] ABSTRACT

Liquid polyvinyl chloride resin stabilizer systems are provided, based on complexes of organic triphosphites with zinc chloride, and, in addition, other compatible polyvinyl chloride resin stabilizers, including particularly, thiophosphites of mercaptocarboxylic acid esters, as well as barium-cadmium and barium-zinc carboxylic acid salt combinations, and liquid barium carbonate-alkyl phenate complexes.

40 Claims, No Drawings

LIQUID POLYVINYL CHLORIDE RESIN STABILIZER SYSTEMS BASED ON COMPLEXES OF ORGANIC TRIPHOSPHITES WITH ZINC CHLORIDE

Stabilizer systems for polyvinyl chloride resins are physically either one of two types: solids and liquids. The first stabilizer systems developed were solids, of which an outstanding example, still in wide use today, is the combinations of metal salt stabilizers and organic triphosphites or hindered phenols of U.S. Pat. No. 2,564,646, patented Aug. 14, 1951, to William E. Leistner, Arthur C. Hecker and Olga H. Knoepke. While many of the triphosphites disclosed there are liquids, the metal salts used are mostly solids and no liquid combinations of the two are disclosed. The triphosphite prevents or retards precipitation of solid metal halide from the stabilizer compound as a cloud or haze in the stock, and is therefore referred to as an anti-clouding agent. A preference is indicated for mixtures of barium and cadmium salts, among others, and in the Examples combinations are used of barium and cadmium laurate, with triphenyl phosphite as the anti-clouding agent.

Combinations of mixed barium-cadmium salt stabilizers, such as barium-cadmium laurates, stearates, and ricinoleates, with organic triphosphites have generally been regarded as the first practical barium-cadmium stabilizers, and they do offer excellent initial color and long-term stability. However, one of their major disadvantages is their tendency to "plate-out" on calendar rolls and other processing equipment.

"Plate-out" is a condition where the calendering rolls and/or embossing rolls become coated with a deposit from the composition being processed. The deposit may start out as a soft waxy material, just barely visible on the metallic contact surfaces of the processing equipment, but this builds up, particularly during long runs, and both the consistency and the quality of the plate-out can then become prohibitive, and interfere with acceptable surface finish of the film or sheeting. When plate-out occurs, the operation has to be shut down and the plate-out removed, which is a costly and time-consuming nuisance.

The plate-out problem was found to be correlated with the solid state of the stabilizer combination, and the answer to the plate-out problem was found to be a liquid stabilizer system. The first liquid stabilizer systems, still in use today, are those described in U.S. Pat. No. 2,716,092, patented Aug. 23, 1955, to William E. Leistner and Arthur C. Hecker. These liquid systems are based on a combination of the polyvalent metal salts, a polyvalent metal salt or salts in conjunction with a water insoluble polyvalent metal salt of a fatty acid, the mixture of the two materials containing to advantage both barium and cadmium in the polyvalent metal component. In a modification, the invention comprises the phenolates and the said salts in conjunction with an organic phosphite. These stabilizer systems were not only liquid but they also showed an enhanced stabilizing effectiveness, as compared to the polyvalent metal salt-triphosphite systems of U.S. Pat. No. 2,564,646, and accordingly these liquid systems found ready acceptance. Outstanding typical examples of this type of liquid system, by no means all of those available commercially, are the MARK M and MARK LL stabilizers, the MARK M and MARK LL systems being barium alkyl phenolate/cadmium carboxylate combinations with organic phosphite, and the MARK PL system being for addition of zinc carboxylate to the MARK M and MARK LL systems.

Liquid systems of this type are completely soluble in plasticizers, and consequently they are readily blended with the polyvinyl chloride resins on a mill by mixing them with the plasticizers, and then compounding the mix with the resin in the usual plasticization procedure. Used in this way, they are quite advantageous in the stabilization of plasticized polyvinyl chloride resins, and afford excellent initial color and outstanding resistance to the degrading effect of heat and light. High temperature processing is possible without the development of yellow undertones, and of course the plate-out problem is eliminated.

Nonetheless, despite these advantages, the available liquid stabilizer systems have not fully replaced solid stabilizer systems. In order to ensure uniformity, it is necessary that the liquid composition be homogeneous, and this homogeneity must be stable on storage. This has required the combination in the liquid of an inert solvent or other liquid solubilizer, which of course also acts as a diluent, and the result is that, weight for weight, the liquid systems do not offer as much barium or cadmium per unit weight as a solid system. This means that more of the liquid system must be used to obtain the same stabilizing effect.

In rigid polyvinyl chloride resins, the maintenance of rigidity and a high softening or fusion temperature means that any liquids to be incorporated into the polymer mix must be kept to a minimum. It is frequently true that the amount of liquid stabilizer required for stabilization is so high that it is impossible to use the liquid for a rigid polymer without deleteriously affecting the rigidity, and lowering the softening temperature too much. In other cases, the liquid system is unable to compete on the same economic level as a solid system because of its lower metal concentration. Besides that, the presence of the inert solvent reduces the flash point, and makes the mixture flammable, a condition which cannot be tolerated under some circumstances.

Baum, U.S. Pat. No. 3,454,514, patented July 8, 1969, discloses a storage-stable stabilizer composition for vinyl halide resin compositions which comprises as a stabilizer base: (a) a cadmium salt of an organic monocarboxylic acid; (b) a salt selected from the group consisting of barium and strontium salts of organic monocarboxylic acids, wherein one of salts (a) and (b) is a salt of an aliphatic monocarboxylic acid and the other is salt of an aromatic monocarboxylic acid, and (c) a zinc salt of an organic monocarboxylic acid; and as about 1% to 50% by weight of said stabilizer base composition, a storage-stable additive comprising about 1 to 50 parts of a higher alkyl monoether of an alkylene glycol and about 1 to 50 parts of an organic carboxylic acid selected from the group consisting of aliphatic monocarboxylic acids and aliphatic dicarboxylic acids. The compositions can be liquid, but solid compositions also fall within the scope of the patent.

The barium salts are salts of organic carboxylic acids and of phenols, such as barium laurate, barium stearate, barium dioctyl phenolate, barium di-nonyl phenolate, and barium dinonyl-o-cresolate, but no "overbased" barium carbonate-alkyl phenate salts are disclosed. The barium plus cadmium content of the stabilizer composition is not disclosed, but in Examples 1 to 10, the liquid compositions, it is about 10%. All of the compositions contain 1 to 50 parts diluent by weight.

A recent example of a relatively dilute solvent-based liquid stabilizer system appears in U.S. Pat. No. 4,159,973, patented July 3, 1979, to Samuel Hoch, Robert E. Lally and Mario Q. Ceprini. The stabilizer systems provided by this patent comprise:

(a) a liquid, oil-soluble, epoxidized vegetable oil-compatible overbased barium salt complex that is the product obtained by contacting a reaction mixture that consists essentially of a basic barium compound, an alkylphenol, and an inert liquid organic diluent, in the amounts of at least 0.75 mole of alkylphenol per mole of barium compound and 10% to 50% by weight of the diluent, based on the weight of the reaction mixture, with carbon dioxide while the reaction mixture is maintained at a temperature of at least 180° C.;
(b) a polyvalent metal salt component;
(c) an organic phosphite component; and
(d) a hydrocarbon solvent;

in the amounts of
0.1 part to 5 parts by weight of the polyvalent metal salt component;
0.1 part to 5 parts by weight of the organic phosphite component; and
0.1 part to 5 parts by weight of the hydrocarbon solvent per part by weight of the overbased barium salt complex.

These stabilizer systems are said to be compatible with epoxidized vegetable oils and form stable mixtures with such oils.

The hydrocarbon solvents named at the top of column 3 are all flammable, and give liquid stabilizers of relatively low flash point. Indeed, in Table II, columns 7 and 8, the solvent used is described as "high-flash naphtha". Moreover, while the concentration of metal in the liquid is nowhere referred to as a consideration, in the Examples the concentration is relatively low, ranging between 7% and 9%. The ratio of cadmium to barium is also rather low, being approximately 0.4 to 1 in the Examples.

The Hoch et al stabilizer systems are based on a special type of overbased barium salt complex that is prepared in accordance with the procedure described in the patent. Hoch et al point out that the normally available overbased barium alkyl phenate complexes are incompatible with epoxidized soybean oil and other epoxidized vegetable oils, and when they are combined with conventional oil-soluble cadmium and zinc salts and organic phosphites, the blend quickly becomes cloudy, as the epoxidized vegetable oil is mixed in, which presents a handling and storage problem, because the liquid system is not homogeneous. This problem is avoided by the special form of overbased barium alkyl phenate complex of the Hoch et al patent.

A further problem posed by the overbased barium alkyl phenate complexes is their relatively high viscosity, which has to be reduced by blending with a hydrocarbon solvent. This problem is alluded to by Hoch et al, who stress that their over-based barium alkyl phenate complexes are nonviscous liquids that are convenient to handle.

Because of the extreme toxicity of cadmium, there is however increasing pressure by governmental agencies upon plastic manufacturers to avoid its use in industrial and consumer products, insofar as possible. While there is not as yet a ban on use of cadmium, it is obviously important to develop stabilizer systems that are the equivalent in effectiveness to the barium-cadmium and barium-cadmium-zinc stabilizer systems that have been so well accepted up until now.

One obvious alternative to the use of cadmium is the substitution of zinc, by itself or in combination with calcium. Zinc and calcium are not toxic, and avoid the toxicity problem of cadmium. However, there are no barium-zinc or barium-calcium-zinc stabilizers known that are as effective as the barium-cadmium and barium-cadmium-zinc stabilizer systems, and those presently available therefore cannot compete effectively with the cadmium-containing systems, except in situations where the use of cadmium has been prohibited.

Normally, as noted above in the Baum patent, zinc is introduced into stabilizer systems of this type in the form of zinc carboxylates, which are compatible with the usual stabilizers, including, in particular, organic triphosphites. Zinc chloride, an inorganic salt, catalyzes the degradation of polyvinyl chloride under many conditions, and is difficult to formulate with other stabilizers as a source of zinc.

Deanin, Gupta and Modi, *Org. Coat. Plast. Chem.* 1979 pp. 199–203 describe a number of stabilizer formulations containing zinc chloride, and conclude that zinc chloride catalyzes the thermodegradation of the polymer, but in small quantities can enhance the stabilizing effectiveness of other stabilizers, including epoxidized soybean oil, and alkylaryl phosphites. They accordingly postulated the function of the zinc chloride as follows:

Epoxy stabilizes the polyvinyl chloride chain by forming a stable ether side group, and the formation of such a group by epoxy is catalyzed by zinc chloride. Increasing quantities of zinc chloride, beyond this catalytic amount, cause the conventional degradation process, but this problem can be overcome by using very large amounts of epoxy.

Jirkal and Stepek, *Plast Mod Elastomeres* 1969 (210) 109–110, 114–115, *Chem. Abstracts* 70 (1969) 88540E, reported that $ZnCl_2$ had a catalytic effect on polyvinyl chloride degradation, the effect increasing with increasing amounts, but that this effect disappeared in the presence of epoxidized soybean oil or triphenyl phosphite.

Rhodes et al, U.S. Pat. No. 3,759,856, patented Sept. 18, 1973, propose liquid stabilizers for polyvinyl chloride resins composed of Group II metal halides, such as zinc chloride and polyglycerol partial esters. The metal halide is dissolved in water, and then mixed with the partial ester. The ingredients are said to be readily compatible, and are apparently present together in solution.

Brook U.S. Pat. No. 3,943,081 describes combinations of alkaline earth metal soap and/or phenolate complexes or solutions with soluble zinc chloride and hydroxy compounds, as well as organic phosphites. These are simple solutions of compatible ingredients, but it is suggested that the zinc chloride may be complexed with the hydroxyl-containing compound, which can be a primary or secondary alcohol, glycol, secondary phosphite, a glycol ether, or a substituted triol or glycol.

Bae U.S. Pat. No. 4,178,282, patented Dec. 11, 1979, provides stabilizer compositions for polyvinyl chloride resins comprising alkali metal soap and/or phenolate complexes or solutions, and alkaline earth metal soap and/or phenolate complexes or solutions, with soluble zinc chloride and hydroxy compounds and organophosphites, the zinc chloride being complexed with the alcohol, as in U.S. Pat. No. 3,943,081.

Snel U.S. Pat. No. 4,369,273, patented Jan. 18, 1983, provides stabilizer compositions composed of substituted alpha or beta naphthindoles, benzoylated or not, and combined with organic polyamines and metal halides of barium, calcium, lithium, zinc or aluminum. The zinc chloride is dissolved in water, and then mixed with a mercaptan and isostearic acid, forming a clear yellow liquid.

Thiophosphates and thiophosphites have also been proposed as polyvinyl chloride resin stabilizers.

Muller, Zinke and Wehner, EPO Pat. No. 90,770 published Oct. 5, 1983, describes stabilizer systems composed of thiophosphates of mercaptocarboxylic acid esters in combination with barium, strontium, calcium, magnesium, zinc or cadmium salts of carboxylic acids or phenols, and phenolic antioxidants. The thiophosphates can be used in combinations with triorganophosphites.

Fath U.S. Pat. No. 2,824,847, patented Feb. 25, 1958, describes polyvinyl chloride resin stabilizer systems containing trithiophosphites, dithiophosphites, or monothiophosphites, which are used with other stabilizers such as barium-cadmium laurate. Some of the phosphites disclosed contain mercaptocarboxylic acid ester groups, such as triisooctylthioglycolate phosphite. Zinc chloride is not disclosed.

In accordance with the present invention, it has been determined that zinc chloride when combined with organic triphosphites forms complexes that are effective polyvinyl chloride resin stabilizers. These complexes are stable liquids that are compatible with other liquid polyvinyl chloride resin stabilizers, such as other organic triphosphites, phenolic antioxidants, polyvalent metal salts, especially barium cadmium and barium zinc salts, barium carbonate-alkyl phenate complexes, and epoxidized fatty acid esters.

The chemical nature of the zinc chloride-phosphite complex has not yet been established. The complex is however readily formed simply by blending zinc chloride and the organic triphosphite, and heating the mixture at an elevated temperature until the zinc chloride dissolves therein, forming the complex. The complex forms readily in a short time, even at temperatures as low as 50° C.

The zinc chloride-organic triphosphite complex displays a synergized stabilizing effectiveness in combinations with many other polyvinyl chloride resin stabilizers, including combinations with thiophosphites of mercaptocarboxylic acid esters, particularly isooctyl thioglycolate, combinations with barium-cadmium and barium zinc carboxylic acid salts, and combinations with barium carbonate-alkyl phenate complexes. Liquid stabilizer systems including the zinc chloride phosphite complex, the thiophosphite, and a barium carbonate-alkyl phenate complex are as effective on an equal metal basis as the available barium-cadmium and barium-cadmium-zinc stabilizers heretofore used. Thus, the liquid stabilizer systems of the invention include liquid stabilizer systems based on zinc instead of cadmium that can compete effectively with liquid barium-cadmium and liquid barium-cadmium-zinc stabilizer systems, as well as improved barium-cadmium with many other polyvinyl chloride resin stabilizers, barium-zinc and barium-cadmium-zinc stabilizer systems.

In addition to the zinc chloride-phosphite complex, the stabilizer systems of the invention therefore can include other conventional liquid-compatible polyvinyl chloride resin stabilizers, particularly thiophosphite stabilizers, other organic triphosphites, organic diphosphites, phenolic antioxidants, polyvalent metal salts, especially barium-cadmium, barium-zinc, and barium-cadmium-zinc carboxylates, barium carbonate-alkyl phenate complexes, and epoxidized fatty acid oils and esters.

The zinc chloride-organic triphosphite complexes are defined by the formula:

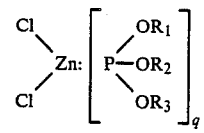

wherein:
$R_1$, $R_2$ and $R_3$ are selected from the group consisting of alkyl having from one to about eighteen carbon atoms; alkenyl having from one to about eighteen carbon atoms; cycloalkyl having from three to about twelve carbon atoms; alkylaryl having from seven to about twenty-four carbon atoms; and aryl having from six to ten carbon atoms; and q is a number representing the number of phosphite groups per zinc chloride group, and ranges from 0.3 to about 3.

The $R_1$, $R_2$, $R_3$, $R_4$, $R_5$ and $R_6$ radicals together with Y are selected so that the resulting complex or phosphite is a liquid.

The zinc chloride-organic triphosphite complexes are readily prepared by simply mixing together zinc chloride and the liquid organic triphosphite, with heating until a clear solution is obtained. An elevated temperature within the range from about 50° to about 150° C. is effective. Decomposition of the complex accompanied by unknown chemical reactions appears to occur at temperatures about 150° C. The most rapid dissolution of zinc chloride takes place at temperatures in excess of 75° C. While in some cases the complexing reaction appears to take place at room temperature, it is normally very very slow, if it proceeds at all, and therefore such low temperatures are not recommended.

In addition to the zinc chloride-organic triphosphite complex, which is the essential ingredient, these stabilizer systems can include any one or more of:
(a) organic thiophosphite;
(b) a liquid barium carbonate-alkyl phenate complex;
(c) a soluble phenolic antioxidant;
(d) a liquid organic triphosphite;
(e) a liquid organic acid phosphite;
(f) a barium-cadmium and/or barium-zinc and/or barium-cadmium-zinc carboxylate;
(g) a calcium carboxylate.

A solvent is not necessary to form a homogeneous storage-stable liquid system if a liquid organic phosphite is selected in which all of the ingredients, including in particular the barium carbonate-akyl phenate, are soluble. Accordingly, the amount of the organic phosphite in the stabilizer system is sufficient to form a homogeneous liquid system with (a) organic thiophosphite, (b) barium carbonate-alkyl phenate and (g) calcium carboxylate, and any other of ingredients (c), (d), (e), (f) and (g) optionally added, as noted above.

This has the advantage that in the absence of any low-boiling solvent, there is no flammable high volatile liquid present, and the flash point of the liquid stabilizer is accordingly at least 96° C. or above while the viscosity of the stabilizer is no more than 400 cps at 25° C.

Because of the solubilizing effect of the organic phosphite, it is possible to incorporate an extraordinarily high proportion of the barium carbonate-alkyl phenate and zinc chloride-phosphite complexes. The minimum is 13 weight % total Ba plus Zn, calculated as the metal, and the total can range to as high as 16%, and even as high as 25%. This high metal concentration has the advantage that much less of the liquid system is required, and virtually renders the liquid system equivalent to a solid system on a weight for weight basis of metal stabilizer. This means that much less is needed in rigid polyvinyl chloride resins, for example, so that the liquid stabilizer systems of the invention can be used in rigid polymers without deleterious effect on the rigidity and softening point.

The high stabilizing effectiveness of the liquid systems of the invention appears to be due in large measure to the stated ratio of zinc to barium. In proportions of zinc to barium outside the range, for example, less barium than the Zn:Ba ratio of 0.5:1, the stabilizing effectiveness is much reduced, which means that more of the stabilizer is required, which in turn would put the composition in the same category as the earlier available low-metal concentration liquid systems.

The organic thiophosphites are defined by the following formula:

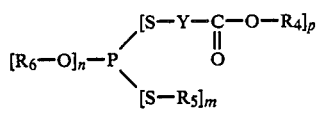

wherein:
p is a number from 1 to 3;
n is a number from 0 to 2;
m is a number from 0 to 2;
and the sum of n+m+p is 3;
Y is straight or branched chain alkylene having from one to about twelve carbon atoms;
$R_4$, $R_5$ and $R_6$ are selected from the group consisting of alkyl having from one to about eighteen carbon atoms; cycloalkyl having from three to about twelve carbon atoms; and alkylaryl having from seven to about twenty-four carbon atoms.

The trithiophosphites in which p is 3 and n and m are each 0 are preferred.

It appears that the mercaptocarboxylic acid ester group of the thiophosphite makes an important contribution to stabilizing effectiveness. Thiophosphites that do not include a mercaptocarboxylic acid ester group are not nearly as effective. The reason for this is not at present understood.

The organic thiophosphites can be prepared by transesterification of an organic triphosphite, such as triphenyl phosphite or triphenyl thiophosphite, with the corresponding mercaptocarboxylic acid ester. Blockage of the carboxylic acid group by the esterifying group makes it possible to effect transesterification with the mercapto group of the mercaptocarboxylic acid ester, which accordingly becomes linked to phosphorus through thiosulfur. The S—$R_5$ and O—$R_6$ groups are introduced likewise by transesterification, with the corresponding mercaptide or alcohol. If a glycol is used, the glycol becomes attached to phosphorus at two positions, if two positions be available.

Trithiophosphites also can be prepared by reacting phosphorus trihalide ($PX_3$) with a mercapto acid ester in the presence of a suitable base such as tertiary amines, aqueous sodium hydroxide, aqueous sodium carbonate, as disclosed in U.S. Pat. No. 3,374,291, patented Mar. 19, 1968, to Myers.

The reaction is as follows:

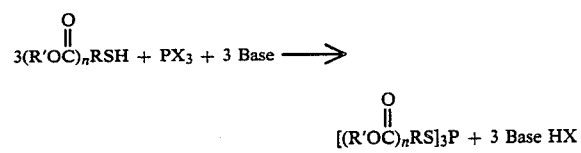

wherein R is a saturated or unsaturated aliphatic group, aryl group, substituted aliphatic or substituted aryl group containing substituents such as halogens, nitro, cyano, alkyl groups etc.; R' is a saturated or unsaturated aliphatic or cycloaliphatic group, an aryl group, or substituted aliphatic, cycloaliphatic or aryl group containing suitable substituents, e.g., halogens, nitro, cyano, alkyl etc.; and n is an integer from 1 to 3 inclusive.

Various amounts of mercapto acid ester and base may be employed. In general, however, the relative proportions are selected so as to supply at least about 3 mols of base per mol of the phosphorus trihalide.

The reaction is desirably carried out in a non-polar solvent, such as benzene, toluene, isooctane, etc. Although the reaction may be conducted at ambient temperatures, reaction temperatures in the range from about 15° to 50° C. and reaction periods of from about 5 to 15 hours are preferred. The products may be recovered by removing the precipitated base-hydrochloride, such as by filtration, washing the filtrate with 15% hydrochloric acid and water to remove unreacted base, and then topping off the non-polar solvent and unreacted mercapto acid ester.

Such trithiophosphites can be obtained from aliphatic mono-carboxylic mercapto acid esters according to the above reaction, and possessing the formula:

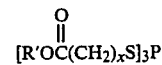

Exemplary thiophosphites for stabilizer compositions of the invention include:
P(SCH$_2$CO—OCH$_2$CH(CH$_3$)$_2$)$_3$
P(SCH$_2$CH$_2$CO—O(CH$_2$)$_5$CH$_3$)$_3$
P(SCH$_2$CO—OC$_{10}$H$_{21}$)$_3$
P(SCH$_2$CH$_2$CO—O(CH$_2$)$_{17}$CH$_3$)$_3$
C$_6$H$_5$OP(SCH$_2$CO—OC$_{12}$H$_{25}$)$_2$
(CH$_{10}$H$_{21}$O)$_2$PSCH$_2$CO—OC$_8$H$_{17}$
C$_{12}$H$_{25}$SP(SCH$_2$CO—OC$_{10}$H$_{21}$)$_2$
(C$_8$H$_{17}$OCOCH$_2$S)$_2$PSCH$_2$CH$_2$CO—OCH$_2$CH(C$_2$H$_5$)C$_4$H$_9$

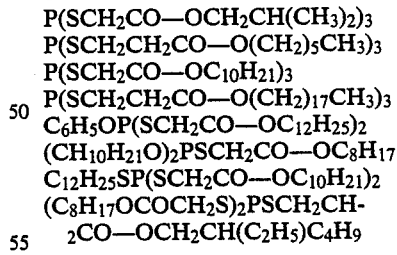

The organic triphosphite esters useful in forming the zinc chloride organic triphosphite complexes, the organic thiophosphites, and also as such in the stabilizer systems of the invention, are liquid over the temperature range from the lowest atmospheric temperatures to be encountered, about −10° C., up to about 200° C. The useful organic triphosphites have from one to three organic radicals attached to phosphorus through oxygen, with all three valences of the phosphorus taken up by such organic radicals.

The liquid organic triphosphites in which the radicals are monovalent radicals can be defined by the formula:

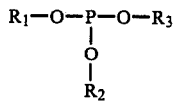

in which

R$_1$, R$_2$ and R$_3$ are selected from the group consisting of alkyl, alkenyl, aryl, alkaryl, aralkyl, and cycloalkyl groups having from one to about thirty carbon atoms.

The liquid organic triphosphites having a bivalent organic radical form a heterocyclic ring with phosphorus of the type:

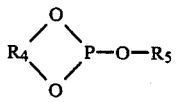

in which R$_4$ is a bivalent organic radical selected from the group consisting of alkylene, arylene, aralkylene, alkarylene and cycloalkylene radicals having from two to about thirty carbon atoms, and R$_5$ is a monovalent organic radical as defined above in the case of R$_1$, R$_2$ and R$_3$.

Also useful liquid organic triphosphites are mixed heterocyclic-open chain phosphites of the type:

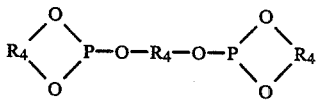

More complex liquid triphosphites are formed from trivalent organic radicals, of the type:

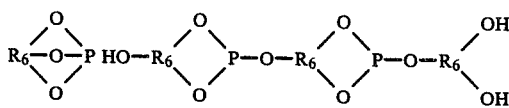

in which R$_6$ is a trivalent organic radical of any of the types of R$_1$ to R$_5$, inclusive, as defined above.

A particularly useful class of complex liquid triphosphites are the tetraoxadiphosphaspiro undecanes of the formula:

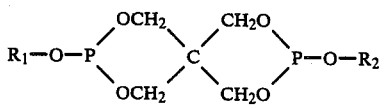

where R$_1$ and R$_2$ are selected from the group consisting of aryl, alkyl, aryloxyethyl, alkyloxyethyl, aryloxyethoxyethyl, alkyloxyethoxyethyl and alkyloxypolyethoxyethyl having from about one to about thirty carbon atoms.

An especially preferred class of liquid organic triphosphites have a bicyclic aromatic group attached to phosphorus through oxygen, with no or one or more phenolic hydroxyl groups on either or both of the aromatic rings. These phosphites are characterized by the formula:

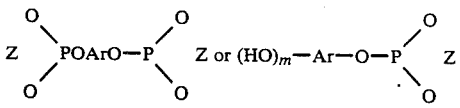

in which Ar is a mono or bicyclic aromatic nucleus and m is an integer of from 0 to about 5. Z is one or a plurality of organic radicals as defined above for R$_1$ to R$_6$, taken singly or together in sufficient number to satisfy the valences of the two phosphite oxygen atoms.

One or both Z radicals can include additional bicyclic aromatic groups of the type (HO)$_m$—Ar.

Usually, the triphosphites do not have more than about sixty carbon atoms.

Exemplary liquid triphosphites are monophenyl di-2-ethylhexyl phosphite, diphenyl mono-2-ethylhexyl phosphite, di-isooctyl monotolyl phosphite, tri-2-ethylhexyl phosphite, phenyl dicyclohexyl phosphite, phenyl diethyl phosphite, triphenyl phosphite, tricresyl phosphite, tri(dimethylphenyl)phosphite, tri(tridecyl)-phosphite, triisooctyl phosphite, tridodecyl phosphite, isooctyl diphenyl phosphite, diisooctyl phenyl phosphite, tri(t-octylphenyl)phosphite, tri(t-nonylphenyl)phosphite, benzyl methyl isopropyl phosphite, butyl dicresyl phosphite, isooctyl di(octylphenyl)phosphite, di(2-ethylhexyl)(isooctylphenyl)phosphite, tri(2-phenylethyl)phosphite, ethylene phenyl phosphite, ethylene isohexyl phosphite, ethylene isooctyl phosphite, ethylene cyclohexyl phosphite, 2-phenoxy-5,5-dimethyl-1,3,2-dioxaphosphorinane, 2-butoxy-1,3,2-dioxyphosphorinane, 2-octoxy-5,5-dimethyldioxaphosphorinane, and 2-cyclohexyloxy-5,5-diethyl dioxaphosphorinane.

Exemplary liquid pentaerythritol triphosphites are 3,9-diphenoxy-2,4,8,10-tetraoxa-3,9-diphosphaspiro-(5,5)-undecane (diphenyl-pentaerythritol-diphosphite), 3,9-di(decyloxy)-2,4,8,10-tetraoxa-3,9-diphosphaspiro(5,5)-undecane, 3,9-di(isodecyloxy)-2,4,8,10-tetraoxa-3,9-diphosphaspiro-(5,5)-undecane, 3-phenoxy-9-isodecyloxy-2,4,8,10-tetraoxa-3,9-diphosphaspiro-(5,5)-undecane, 3,9-di(methoxy)-2,4,8,10-tetraoxa-3,9-diphosphaspiro-(5,5)-undecane, 3,9-di(lauryloxy)-2,4,8,10-tetraoxa-3,9-diphosphaspiro-(5,5)-undecane, 3,9-di-p-tolyloxy-2,4,8,10-tetraoxa-3,9-diphosphaspiro-(5,5)-undecane; 3,9-di(methoxyethyloxy)-2,4,8,10-tetraoxa-3,9-diphosphaspiro-(5,5)-undecane; 3-methoxyethyloxy-9-isodecyloxy-2,4,8,10-tetraoxa-3,9-diphosphaspiro-(5,5)-undecane; 3,9-di(ethoxyethyloxy)-2,4,8,10-tetraoxa-3,9-diphosphaspiro-(5,5)-undecane; 3,9-di(butoxyethyloxy)-2,4,8,10-tetraoxa-3,9-diphosphaspiro-(5,5)-undecane; 3-methoxyethyloxy-9-butoxyethyloxy-2,4,8,10-tetraoxa-3,9-diphosphaspiro-(5,5)-undecane; 3,9-di(methoxyethoxyethyloxy)-2,4,8,10-tetraoxa-3,9-diphosphaspiro-(5,5)-undecane; 3,9-di(butoxyethoxyethyloxy)-2,4,8,10-tetraoxa-3,9-diphosphaspiro-(5,5)-undecane; 3,9-di(methoxyethoxyethoxyethyloxy)-2,4,8,10-tetraoxa-3,9-diphosphaspiro-(5,5)-undecane; 3,9-di(methoxy(polyethoxy)ethyloxy)-2,4,8,10-tetraoxa-3,9-diphosphaspiro-(5,5)-undecane (where the (polyethoxy)ethyloxy group has an average molecular weight of 350) 3,9-di(methoxy(polyethoxy)ethyloxy)-2,4,8,10-tetraoxa-3,9-diphosphaspiro-(5,5)-undecane (where the (polyethoxy)ethyloxy group has an average molecular weight of 550).

Exemplary liquid bis aryl triphosphites are: bis(4,4'-thio-bis(2-tertiary butyl-5-methyl-phenol)isooctyl phosphite, mono(4,4'-thio-bis(2-tertiary-butyl-5-methyl phenol))di-phenyl phosphite, tri-(4,4'-n-butylidene-bis(2-tertiary-butyl-5-methylphenol))phosphite, (4,4'-benzylidene-bis(2-tertiary-butyl-5-methyl phenol))diphenyl phosphite, isooctyl 2,2'-bis(-parahydroxyphenyl)propane phosphite, decyl 4,4'-n-butylidene-bis(2-tertiarybutyl-5-methylphenol)phosphite, tri-4,4'-thio-bis(2-tertiary-butyl-5-methylphenol)phosphite, 2-ethylhexyl-2,2'-methylene-bis-(4-methyl-6,1'-methylcyclohexyl)-phenol phosphite, tri(2,2'-bis(para-hydroxyphenyl)-propane)phosphite, tri(4,4'-thio-bis(2-tertiary-butyl-5-methyl-phenol)phosphite, isooctyl-(2,6-bis(2'-hydroxy-3,5-dinonylbenzyl)-4-nonyl phenyl))phosphite, tetra-tridecyl 4,4'-n-butylidene-bis(2-tertiary butyl-5-methyl phenyl)diphosphite, tetra-isooctyl 4,4'-thio-bis(2-tertiary butyl-5-methyl phenyl)diphosphite, 2,2'-methylene-bis(4-methyl 6,1'-methyl cyclohexyl phenyl)polyphosphite, isooctyl-4,4'-isopropylidene-bis-phenyl-polyphosphite, 2-ethylhexyl-2,2'-methylene-bis(4-methyl-6,1'-methyl-cyclohexyl)phenyl triphosphite, tetra-tridecyl-4,4'-oxydiphenyl diphosphite, tetra-n-dodecyl-4,4'-n-butylidene bis(2-tertiary-butyl-5-methylphenyl)-diphosphite, tetra-tridecyl-4,4'-iso-propylidene bisphenyl diphosphite, hexatridecyl butane-1,1,3-tris(2'-methyl-5'-tertiary-butylphenyl-4'-)triphosphite.

The acid phosphite can be any organic phosphite having one or two organic radicals attached to phosphorus through oxygen, and one or two hydrogen atoms.

The acid phosphites are defined by the formula:

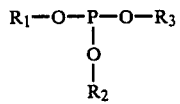

in which $R_1$, $R_2$ and $R_3$ are selected from the group consisting of hydrogen, alkyl, alkenyl, aryl, alkaryl, aralkyl, and cycloalkyl groups having from one to about thirty carbon atoms, and at least one to two of $R_1$, $R_2$ and $R_3$ is hydrogen.

Exemplary liquid acid phosphites are di(phenyl)-phosphite, monophenyl phosphite, mono-(diphenyl)-phosphite, dicresyl phosphite, di-o-(isooctylphenyl)-phosphite, di(p-ethylhexylphenyl)phosphite, di(p-t-octylphenyl)phosphite, di(dimethylphenyl)phosphite, di-n-butyl phosphite, di-2-ethylhexyl phosphite, mono-2-ethylhexyl phosphite, diisooctyl phosphite, monoisooctyl phosphite, monododecyl phosphite, 2-ethylhexyl phenyl phosphite, 2-ethylhexyl-(n-octylphenyl)-phosphite, monocyclohexyl phosphite, dicyclohexyl phosphite, di(2-cyclohexyl phenyl)phosphite, di-α-naphthyl phosphite, diphenyl phenyl phosphite, di(diphenyl)phosphite, di-(2-phenyl ethyl)phosphite, dibenzyl phosphite, monobenzyl phosphite, n-butyl cresyl phosphite and didodecyl phosphite, cresyl phosphite, t-octylphenyl phosphite, ethylene phosphite, butyl cresyl phosphite, isooctyl monotolyl phosphite and phenyl cyclohexyl phosphite.

Exemplary liquid bis aryl acid phosphites are: bis(4,4'-thio-bis(2-tertiary-butyl-5-methyl-phenol))-phosphite, (4,4'-thio-bis(2-tertiary-butyl-5-methyl-phenol))phenyl phosphite, bis(4,4'-n-butylidene-bis(2-tertiary-butyl-5-methyl-phenol))phosphite, mono(4,4'-benzylidene-bis(2-tertiary-butyl-5-methyl-phenol))-phosphite, mono(2,2'-bis-(parahydroxyphenyl)-propane)phosphite, mono(4,4'-n-butylidene-bis(2-tertiary-butyl-5-methyl-phenol)phosphite, bis(4,4'-thio-bis(2-tertiary-butyl-5-methylphenol))phosphite, mono-2-ethylhexyl-mono-2,2'methylene-bis(4-methyl-6,1'methylcyclohexyl)phenol phosphite, bis(2,2'-bis-(parahydroxyphenyl)propane)phosphite, monoisooctyl mono(4,4'-thio-bis(2-tertiary-butyl-5-methyl-phenol))-phosphite, isooctyl-(2,6-bis(2'-hydroxy-3,5-dinonylbenzyl)-4-nonyl phenyl))phosphite, tri-tridecyl 4,4'-n-butylidene-bis(2-tertiary-butyl-5-methyl phenyl)diphosphite, triisooctyl 4,4'-thio-bis(2-tertiary-butyl-5-methyl phenyl)diphosphite, bis(2,2'-methylene-bis(4-methyl-6,1'-methyl cyclohexyl phenyl))phosphite, isooctyl-4,4'-isopropylidene-bis-phenyl phosphite, monophenyl mono(2,2'-methylene-bis-(4-methyl-6,1'-methyl-cyclohexyl))triphosphite, di-tridecyl-4,4'-oxydiphenyl diphosphite, di-n-dodecyl-4,4'-n-butylidene bis(2-tertiary-butyl-5-methylphenyl)diphosphite, di-tridecyl-4,4'-isopropylidene bisphenyl diphosphite, tetra-tridecyl butane-1,1,3-tris(2'-methyl-5'-tertiary-butylphenyl-4-)triphosphite.

The liquid barium carbonate-alkyl phenate complex is known and described in U.S. Pat. No. 3,787,357, patented Jan. 22, 1974, to Lawrence Robert Brecker. The barium carbonate is combined with at least one barium alkyl phenate, usually in a relatively nonvolatile organic liquid, which acts as a liquefying agent for the carbonate, by itself or in combination with a nonvolatile polar compound. The barium alkyl phenate disperses the carbonate in the organic solvent during or after its formation.

The relatively nonvolatile organic liquid can be a hydrocarbon oil, a plasticizer, an epoxy ester, etc., or a combination thereof.

The proportion of barium carbonate to organic salt in this carbonate-organic salt combination is defined by the metal ratio, which is a number greater than 2, i.e., the number of metal equivalents is greater than the number of equivalents of the organic acid residue of the organic salt. The metal ratio can be as high as 20, or even higher, the limit being imposed only by an unacceptably high viscosity of the barium carbonate-barium alkyl phenate combination.

The alkyl phenate residue of the barium alkyl phenate has at least ten carbon atoms. There is no upper limit for the carbon content except that set by the availability of materials. Barium alkyl phenates with as many as 150 carbon atoms in the alkyl phenate residue give excellent results.

Exemplary alkyl phenols that can be used as their barium salt include secondary butyl-phenol, o-amyl-phenol, heptyl-phenol, tert-nonyl-phenol, capryl-phenol, 6-t-butyl-2,4-dimethyl-phenol, 2,6-di-tert-butyl p-cresol, p-t-octyl-phenol, di-nonyl-phenol, decyl-phenol, dodecyl-phenol, and paraffin wax-alkyl-phenol; cycloalkyl-phenols such as o-cyclohexyl-phenol, p-cyclohexylphenol, and cyclooctyl-p-cresol; aralkyl-phenols such as 4-benzyl-o-cresol and ortho- and para-alphamethylbenzyl-phenols, and mixtures thereof.

The barium alkyl phenate salt may contain free unreacted phenol.

These barium carbonate-barium alkyl phenates are visually clear liquids, and leave no residue on filtration.

Many liquid barium carbonate-barium alkyl phenates are known. There is an extensive patent literature describing the preparation of such compositions. Unfortunately, the terminology employed is not uniform. Such compositions are sometimes referred to as solutions of oil-soluble barium carbonates, and sometimes as dispersions of oil-insoluble barium carbonates. The compositions are often called "overbased", to indicate that the ratio of total barium contained therein to the organic moiety is greater than the stoichiometric ratio of the neutral barium alkyl phenate, i.e., the number of barium equivalents is greater than the number of equivalents of the alkyl phenate residue.

Analytical techniques are available for determining the barium ratio and to characterize the liquid combinations of barium carbonate with barium alkyl phenate. The total barium content can be determined by standard methods such as atomic absorption, or extraction into aqueous hydrochloric acid, and complexometric titration of the barium in the extract.

The barium present as carbonate is measured in terms of the combined carbon dioxide content and the metal ratio is given by the expression:

$$2 \times \frac{\text{total equivalents of barium/g of sample}}{\text{total equivalents of barium/g of sample-equivalents } CO_2/g}$$

Liquid barium carbonates can be readily prepared by suspending, for instance, a barium base, e.g., oxide, hydroxide, alkoxide, carboxylate, phenate, etc., in a polar organic medium, carbonating the barium compound at elevated temperatures, and transferring the carbonated product to a relatively nonvolatile organic liquid containing a barium alkyl phenate with or without subsequent hydrolysis and removal of volatiles before final filtration of the resulting liquid. The sequence of operations is not critical; the barium alkyl phenate can be present during the carbonation.

The polar organic medium used for the reaction can contain volatile and nonvolatile polar compounds, called promoters in the literature. The volatile polar compounds are removed during the process and are not present in the finished product. A comprehensive overview of liquid organic combinations of barium carbonates, with barium alkyl phenates, their ingredients and their methods of manufacture can be obtained from a selected group of patents, for example, P. Asseff U.S. Pat. No. 2,616,905, F. Koft U.S. Pat. No. 3,544,463, and W. LeSuer U.S. Pat. No. 2,959,551.

A number of commercially available liquid barium carbonate-barium alkyl phenate compositions are suitable for use in preparing the liquid stabilizer systems of this invention. The following represents a nonlimiting selection:

| Material | Supplier | % Ba |
|---|---|---|
| Barium carbonate-barium dodecyl phenate | Lubrizol Corp. Wickcliffe, Ohio | |
| LD 2106 | | 26 |
| LD 2103 | | 23 |

The barium-cadmium, barium-zinc, barium-cadmium-zinc, and calcium carboxylates are salts of a nonnitrogenous monocarboxylic acid having from about five to about twenty-two carbon atoms, and selected from the group consisting of
(a) straight and branched chain aliphatic carboxylic acids having from about five to about eighteen carbon atoms;
(b) aromatic carboxylic acids having from about seven to about eleven carbon atoms; and
(c) unsaturated straight and branched chain aliphatic carboxylic acids having from about twelve to about twenty-two carbon atoms.

Exemplary straight chain carboxylic acids include butyric acid, valeric acid, capric acid, caprylic acid, lauric acid, myristic acid, palmitic acid and stearic acid.

Exemplary branched chain aliphatic carboxylic acids include $\beta$-methyl butyric acid, $\alpha$-methyl butyric acid, 2-ethyl hexoic acid, isooctoic acid, 3,5,5-trimethyl hexoic acid, trimethyl acetic acid, 2,2-dimethyl pentanoic acid, neodecanoic acid, and 2-methyl-2-ethyl hexoic acid.

Exemplary unsaturated aliphatic carboxylic acids include oleic acid, linoleic acid, linolenic acid, ricinoleic acid and erucic acid.

Exemplary aromatic acids include benzoic acid, ortho-, meta- and para-toluic acid; ortho-, meta- and para-ethylbenzoic acid; ortho-, meta- and para-butyl benzoic acid; ortho-, meta- and para-amyl benzoic acid; the various dimethyl benzoic acid isomers; the various diethyl benzoic acid isomers; and the various trimethyl benzoic acid isomers.

The barium-cadmium, barium-zinc, barium-cadmium-zinc and calcium carboxylates can be a liquid or a solid, in which case it is soluble in the liquid stabilizer system. A solid carboxylate can also be liquefied in course of preparation, by carrying out the formation of the salt in the presence of a high-boiling organic solvent for the resulting carboxylate. This solvent will then be present in the finished salt, and accompany it in the blending with the other components of the liquid stabilizer system. The solvent, if used, should have a boiling point of at least 180° C., and the maximum amount should not exceed 12% solvent by weight of the stabilizer system, after combination of the liquefied carboxylate with the other components.

Useful solvents include aliphatic, cycloaliphatic, and aromatic hydrocarbons; aliphatic, cycloaliphatic and aromatic alcohols, ether alcohols, and ether alcohol esters; and esters of organic and inorganic acids, such as the alkyl, cycloalkyl and aryl phosphoric acid esters, benzoic acid esters, and stearic acid esters. Illustrative preparations of the liquefied carboxylate are given in the Examples.

Inasmuch as solvent may accompany the liquefied carboxylate in the homogeneous liquid stabilizer systems of the invention, the term "substantially solvent-free" when used to describe the systems of the invention does not exclude such solvent in amounts up to 12% by weight of the liquid stabilizer system.

The phenolic antioxidant should be a liquid, but need not be, since it is soluble in the liquid stabilizer system, and contains one or more phenolic hydroxyl groups, and one or more phenolic nuclei, and can contain from about eight to about three hundred carbon atoms. In addition, the phenolic nucleus can contain an oxy or thio ether group.

The alkyl-substituted phenols and polynuclear phenols, because of their molecular weight, have a higher boiling point and therefore are preferred because of their lower volatility. There can be one or a plurality of alkyl groups of one or more carbon atoms. The alkyl group or groups including any alkylene groups between phenol nuclei preferably aggregate at least four carbon atoms. The longer the alkyl or alkylene chain, the better the compatability with the liquid stabilizer system, and therefore there is no upper limit on the number of alkyl carbon atoms. Usually from the standpoint of availability, the compound will not have more than about eighteen carbon atoms in an alkyl, alicyclidene and alkylene group, and a total of not over about fifty carbon atoms. The compounds may have from one to four alkyl radicals per phenol nucleus.

The phenol contains at least one and preferably at least two phenolic hydroxyls, the two or more hydroxyls being in the same ring, if there is only one. In the case of bicyclic phenols, the rings can be linked by thio or oxyether groups, or by alkylene, alicyclidene or arylidene groups.

The monocyclic phenols which can be employed have the structure:

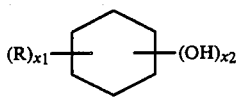

R is selected from the group consisting of hydrogen; halogen; and organic radicals containing from one to about thirty carbon atoms, such as alkyl, aryl, alkenyl, alkaryl, aralkyl, cycloalkenyl, cycloalkyl, alkoxy, and acyl

where R' is aryl, alkyl or cycloalkyl;

$x_1$ and $x_2$ are integers from one to four, and the sum of $x_1$ and $x_2$ does not exceed six.

The polycyclic phenol employed in the stabilizer combination is one having at least two aromatic nuclei linked by a polyvalent linking radical, as defined by the formula:

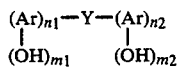

wherein

Y is a polyvalent linking group selected from the group consisting of oxygen; carbonyl; sulfur; sulfinyl; aromatic, aliphatic and cycloaliphatic hydrocarbon groups; and oxyhydrocarbon, thiohydrocarbon and heterocyclic groups. The linking group can have from one up to twenty carbon atoms;

Ar is a phenolic nucleus which can be a phenyl or a polycarbocyclic group having condensed or separate phenyl rings; each Ar group contains at least one free phenolic hydroxyl group up to a total of five. The Ar rings can also include additional rings connected by additional linking nuclei of the type Y, for example, Ar—Y—Ar—Y—Ar;

$m_1$ and $m_2$ are numbers from one to five, and $n_1$ and $n_2$ are numbers of one or greater, and preferably from one to four.

The aromatic nucleus Ar can, in addition to phenolic hydroxyl groups, include one or more inert substituents. Examples of such inert substituents include hydrogen, halogen atoms, e.g., chlorine, bromine and fluorine; organic radicals containing from one to about thirty carbon atoms, such as alkyl, aryl, alkaryl, aralkyl, cycloalkenyl, cycloalkyl, alkoxy, aryloxy and acyloxy

where R' is aryl, alkyl or cycloalkyl, or thiohydrocarbon groups having from one to about thirty carbon atoms, and carboxyl

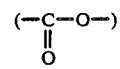

groups. Usually, however, each aromatic nucleus will not have more than about eighteen carbon atoms in any hydrocarbon substituent group. The Ar group can have from one to four substituent groups per nucleus.

Typical aromatic nuclei include phenyl, naphthyl, phenanthryl, triphenylenyl, anthracenyl, pyrenyl, chrysenyl, and fluorenyl groups.

When Ar is a benzene nucleus, the polyhydric polycyclic phenol has the structure:

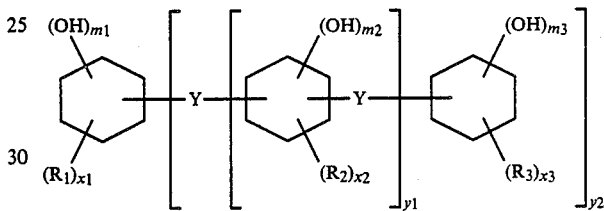

wherein $R_1$, $R_2$ and $R_3$ are inert substituent groups as described in the previous paragraph;

$m_1$ and $m_3$ are integers from one to a maximum of five;

$m_2$ is an integer from one to a maximum of four;

$x_1$ and $x_3$ are integers from zero to four; and $x_2$ is an integer from zero to three;

$y_1$ is an integer from zero to six; and $y_2$ is an integer from one to five, preferably one or two.

Preferably, the hydroxyl groups are located ortho and/or para to Y.

Exemplary Y groups are alkylene, alkylidene, and alkenylene arylene, alkylarylene, arylalkylene, cycloalkylene, cycloalkylidene, and oxa- and thia-substituted such groups; carbonyl groups, tetrahydrofuranes, esters and triazino groups. The Y groups are usually bi, tri, or tetravalent, connecting two, three or four Ar groups. However, higher valency Y groups, connecting more than four Ar groups can also be used. According to their constitution, the Y groups can be assigned to subgenera as follows:

(1) Y groups where at least one carbon in a chain or cyclic arrangement connect the aromatic groups, such as:

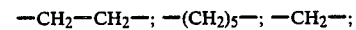

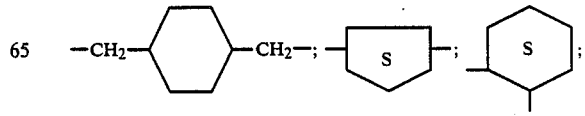

-continued

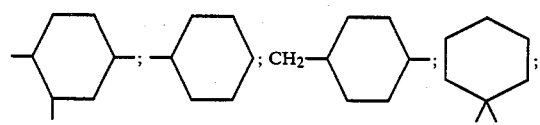

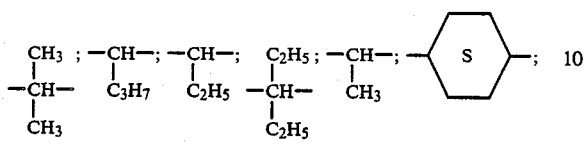

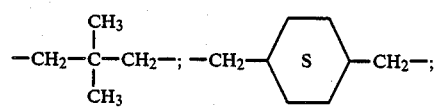

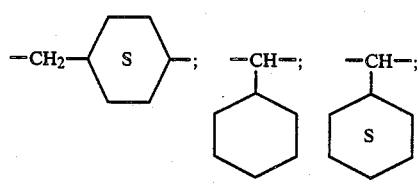

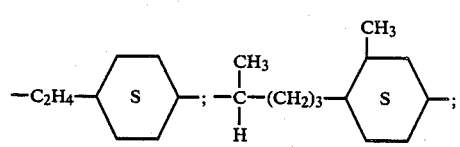

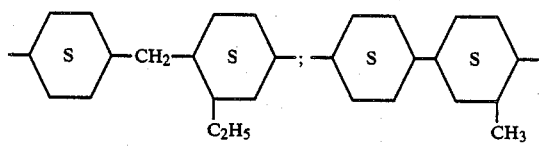

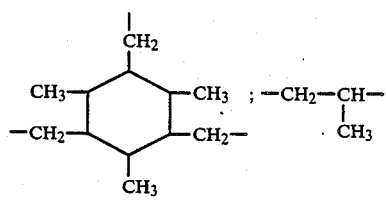

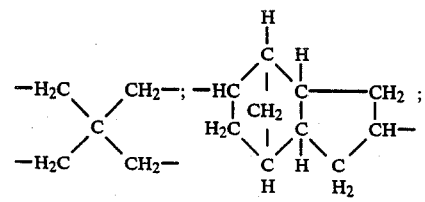

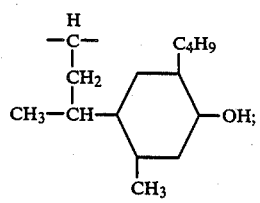

(2) Y groups made up of more than a single atom including both carbon and other atoms linking the aromatic nuclei, such as:

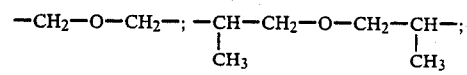

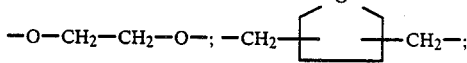

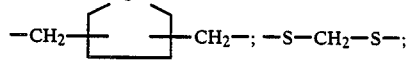

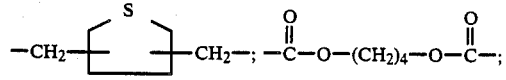

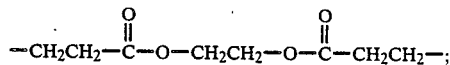

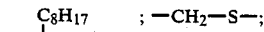

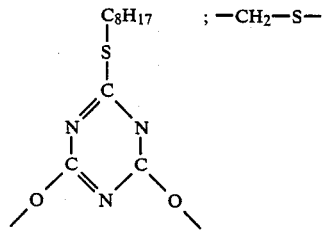

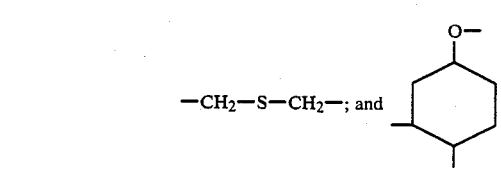

Although the relation of effectiveness to chemical structure is insufficiently understood, many of the most effective phenols have Y groups of subgenus (1), and accordingly this is preferred. Some of these phenols can be prepared by the alkylation of phenols or alkyl phenols with polyunsaturated hydrocarbons such as dicyclopentadiene or butadiene.

Representative phenols include guaiacol, resorcinol monoacetate, vanillin, butyl salicylate, 2,6-di-tert-butyl-4-methyl phenol, 2-tert-butyl-4-methoxy phenol, 2,4-dinonyl phenol, 2,3,4,5-tetradecyl phenol, tetrahydro-α-naphthol, o-, m- and p-cresol, o-, m- and p-phenylphenol, o-, m- and p-xylenols, the carvenols, symmetrical xylenol, thymol, o-, m- and p-nonylphenol, o-, m- and p-dodecyl-phenol, and o-, m- and p-octyl phenol, o-, and m-tert-butyl-p-hydroxy-anisole, p-n-decycloxyphenol, p-n-decyloxycresol, nonyl-n-decyloxy-cresol, eugenol, isoeugenol, glyceryl monosalicylate, methyl-p-hydroxy-cinnamate, 4-benzyloxy-phenol, p-acetylaminophenol, p-stearyl-aminophenol methyl-p-hydroxy benzoate, p-di-chlorobenzoyl-aminophenol, p-hydroxysalicyl anilide, stearyl-(3,5-di-methyl-4-hydroxy-benzyl)thioglycolate, stearyl-β-(4-hydroxy-3,5-di-t-butylphenyl)propionate, distearyl- 3,5-di-t-butyl-4-hydroxybenzylphosphonate, and distearyl (4-hydroxy-3-methyl-5-t-butyl)benzylmalonate.

Exemplary polyhydric phenols are orcinol, propyl gallate, catechol, resorcinol, 4-octyl-resorcinol, 4-dodecyl-resorcinol, 4-octadecyl-catechol, 4-isooctyl-phloroglucinol, pyrogallol, hexahydroxybenzene, 4-isohexyl-catechol, 2,6-di-tertiary-butylresorcinol, 2,6-di-isopropyl-phloroglucinol.

Exemplary polyhydric polycyclic phenols are methylene bis-(2,6-di-tertiary-butyl-phenol), 2,2-bis-(4-hydroxy phenyl)propane, methylene-bis-(p-cresol), 4,4'-benzylidene bis-(2-tertiary-butyl-5-methyl-phenol), 4,4'-cyclohexylidene bis-(2-tertiary-butylphenol), 2,2'-methylene-bis-(4-methyl-6-(1'-methyl-cyclohexyl)-phenol), 2,6-bis-(2'-hydroxy-3'-tertiary-butyl-5'-methyl-benzyl)-4-methylphenol, 4,4'-bis-(2-tertiary-butyl-5-methyl-phenol), 2,2'-bis-(4-hydroxy-phenyl)butane, ethylene bis(p-cresol), 4,4'-n-butylidene-(2-t-butyl-5-methyl-phenol), 2,2'-methylene-bis-(4-methyl-6-(1'-methyl-cyclohexyl)-phenol), 4,4'-cyclohexylene bis-(2-tertiary-butyl-phenol), 2,6-bis-(2'-hydroxy-3'-t-butyl-5'-methyl-hydroxyphenyl)propionyl-oxyethyl isocyanurate, 2-octylthio-4,6-di-(4-hydroxy-3,5-di-t-butyl)phenoxy-1,3,5-triazine, and pentaerythritol hydroxyphenyl propionate.

A particularly desirable class of polyhydric polycyclic phenols are the dicyclopentadiene polyphenols, which are of the type:

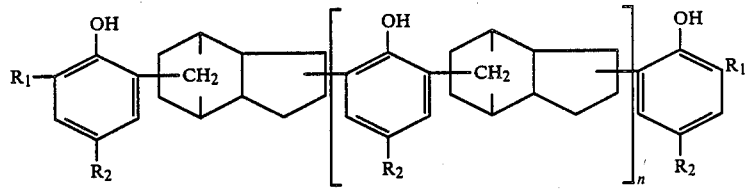

in which

R₁ and R₂ are lower alkyl, and can be the same or different, and n is the number of the groups enclosed by the brackets, and is usually from 1 to about 5. These are described in U.S. Pat. No. 3,567,683, dated Mar. 2, 1971 to Spacht. A commercially available member of this class is Wingstay L, exemplified by dicyclopentadiene tri-(2-tert-butyl-4-methyl-phenol) of the formula:

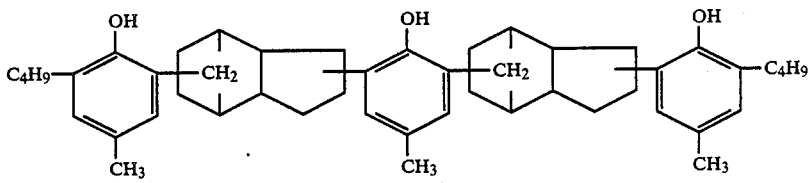

benzyl)-4-methyl-phenol, 1,3'-bis(naphthalene-2,5-diol)-propane, and 2,2'-butylene bis-(naphthalene-2,7-diol), (3-methyl-5-tert-butyl-4-hydroxyphenyl)-4'-hydroxyphenyl)propane, 2,2'-methylene-bis-(4-methyl-5-isopropylphenol), 2,2'-methylene bis-(5-tert-butyl-4-chlorophenol), (3,5-di-tert-butyl-4-hydroxyphenyl)-(4'-hydroxy-phenyl)ethane, (2-hydroxy-phenyl)-(3',5'-di-tert-butyl-4',4-hydroxyphenyl)ethane, 2,2'-methylene bis-(4-octylphenol), 4,4'-propylene bis-(2-tert-butyl-phenol), 2,2'-isobutylene bis-(4-nonylphenol), 2,4-bis-(4-hydroxy-3-t-butylphenoxy)-6-(n-octylthio)-1,3,5-triazine, 2,4,6-tris-(4-hydroxy-3-t-butyl-phenoxy)-1,3,5-triazine, 4,4'-bis-(4-hydroxy-phenyl)pentanoic acid octadecyl ester, cyclopentylene-4,4'-bis-phenol, 2-ethylbutylene-4,4'-bisphenol, 4,4'-cyclooctylene-bis-(2-cyclohexylphenol), β,β-thiodiethanol bis-(3-tert-butyl-4-hydroxyphenoxy acetate), 1,4-butanediol-bis-(3-tert-butyl-4-hydroxyphenoxy acetate), pentaerythritoltetra-(4-hydroxyphenol propionate), 2,4,4'-tri-hydroxy benzophenone, 4,4'-bis-(4-hydroxy-phenol)pentanoic acid octadecyl thiopropionate ester, 1,1,3-tris-(2'-methyl-4-hydroxy-5'-tert-butylphenyl)butane, 1,1,3-tris-(1-methyl-3-hydroxy-4-tert-butylphenyl)butane, 1,8-bis-(2-hydroxy-5-methylbenzoyl-n-octane, 1-methyl-3-(3-methyl-5-tert-butyl-4-hydroxy-benzyl)-naphthalene, 2,2'-(2-butene)-bis-(4-methoxy-6-tert-butyl phenol)-bis-[3,3-bis-(4-hydroxy-3-t-butylphenyl)butyric acid]glycol ester, 4,4'-butylidene-bis-(6-t-butyl-m-cresol), 1,1,3-tris-(2-methyl-4-hydroxy-5-t-butylphenyl)butane, 1,3,5-tris-(3,5-di-t-butyl-4-hydroxybenzyl)-2,4,6-trimethylbenzene, tetrakis[methylene-3-(3,5-di-t-butyl-4-hydroxyphenyl)propionate]methane, 1,3,5-tris-(3,5-di-t-butyl-4-hydroxybenzyl)isocyanurate, 1,3,5-tris-(3,5-di-t-butyl-4-

The polyhydric polycyclic phenols used in the invention can also be condensation products of phenol or alkylphenols with hydrocarbons having a bicyclic ring structure and a double bond or two or more double bonds, such as α-pinene, β-pinene, dipentene, limonene, vinylcyclohexene, dicyclopentadiene, allo-ocimene, isoprene and butadiene. These condensation products are usually obtained under acidic conditions in the form of more or less complex mixtures of monomeric and polymeric compounds. However, it is usually not necessary to isolate the individual constituents. The entire reaction product, merely freed from the acidic condensation catalyst and unchanged starting material, can be used with excellent results. While the exact structure of these phenolic condensation products is uncertain, the Y groups linking the phenolic nuclei all fall into the preferred subgenus (1). For method of preparation, see e.g., U.S. Pat. Nos. 3,124,555, 3,242,135 and British Pat. No. 961,504.

Particularly useful stabilizers that are also plasticizers are the epoxy higher esters having from 20 to 150 carbon atoms. Such esters will initially have had unsaturation in the alcohol or acid portion of the molecule, which is taken up by the formation of the epoxy group.

Typical unsaturated acids are acrylic, oleic, linoleic, linolenic, erucic, ricinoleic, and brassidic acids, and these may be esterified with organic monohydric or polyhydric alcohols, the total number of carbon atoms of the acid and the alcohol being within the range stated. Typical monohydric alcohols include butyl alcohol, 2-ethyl hexyl alcohol, lauryl alcohol, isooctyl alcohol, stearyl alcohol, and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerol is preferred. These alcohols may be fully or partially esterified with the epoxidized acid. Also useful are the epoxidized mixtures of higher fatty acid esters found in naturally-occurring oils such as epoxidized soybean oil, epoxidized olive oil, epoxidized coconut oil, epoxidized cotton-seed oil, epoxidized tall oil fatty acid esters and epoxidized tallow. Of these, epoxidized soybean oil is preferred.

The alcohol can contain the epoxy group and have a long or short chain, and the acid can have a short or long chain, such as epoxystearyl acetate, epoxystearyl stearate, glycidyl stearate, and polymerized glycidyl methacrylate.

The liquid stabilizer systems of the invention are effective in enhancing the resistance to deterioration by heat and light of any polyvinyl chloride resin. The term "polyvinyl chloride" as used herein is inclusive of any polymer formed at least in part of the recurring group:

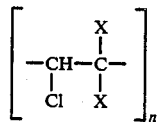

and having chlorine content in excess of 40%. In this group, the X groups can each be either hydrogen or chlorine, and n is the number of such units in the polymer chain. In polyvinyl chloride homopolymers, each of the X groups is hydrogen. Thus, the term includes not only polyvinyl chloride homopolymers but also after-chlorinated polyvinyl chlorides as a class, for example, those disclosed in British Pat. No. 893,288 and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene. The stabilizer systems are effective also with mixtures of polyvinyl chloride in a major proportion with a minor proportion of other synthetic resins such as chlorinated polyethylene or a copolymer of acrylonitrile, butadiene and styrene.

These liquid stabilizer systems are of particular application to the stabilization of rigid polyvinyl chloride resin compositions, that is, resin compositions which are formulated to withstand high processing temperatures, of the order of 375° F. and higher, and whose mechanical strength would be adversely affected by an unduly high amount of liquid or low melting additive.

The stabilizer compositions of the invention can also be used with plasticized polyvinyl chloride resin compositions of conventional formulation, even though resistance to heat distortion is not a requisite. Conventional plasticizers well known to those skilled in the art can be employed such as, for example, dioctyl phthalate, octyl diphenyl phosphate and epoxidized soybean oil.

The polyvinyl chloride resin can be in any physical form, including, for example, powders, films, sheets, molded articles, foams, filaments, and yarns.

A sufficient amount of the stabilizer system is used to enhance the resistance of the polyvinyl chloride to deterioration in physical properties, including, for example, discoloration and embrittlement, under the heat and/or light conditions to which the polymer will be subjected. Very small amounts are usually adequate. Amounts within the range from about 0.001 to about 15% liquid stabilizer system by weight of the polyvinyl chloride resin are satisfactory. Preferably, an amount within the range from about 0.05 to about 5%, is employed for optimum stabilizing effectiveness.

Inasmuch as all of the essential components are liquids, the liquid stabilizer systems of the invention are readily formed as homogeneous liquids by simple blending and mutual dissolution, with heating, if necessary.

The zinc-chloride-organic triphosphite complex stabilizer systems comprise a blend of:
(a) zinc chloride-organic triphosphite complex in an amount within the range from about 20 to 40 parts by weight; and
any one or more of the following amounts of optional ingredients:
(b) organic thiophosphite containing at least one mercaptocarboxylic acid ester group in an amount within the range from about 20 to about 40 parts by weight;
(c) organic triphosphite in an amount within the range from about 25 to 45 parts by weight;
(d) barium carbonate-barium alkyl phenate in an amount within the range from about 20 to about 40 parts by weight;
(e) barium-cadmium and/or barium-zinc and/or barium-cadmium-zinc and/or calcium carboxylate of any of the acids noted above in an amount within the range from about 1 to about 10 parts by weight;
(f) phenolic antioxidant in an amount within the range from about 0.01 to about 1 part by weight;
(g) acid phosphite in an amount within the range from about 0.5 to about 5 parts by weight.

The liquid stabilizer systems of the invention can be employed as the sole stabilizer. They can also be used in combination with other conventional heat and light stabilizers for polyvinyl chloride resins, such as, for example, hydroxybenzophenones, organotin compounds, and epoxy compounds.

In addition, any of the conventional polyvinyl chloride resin additives, such as lubricants, emulsifiers, antistatic agents, flame-proofing agents, pigments and fillers, can be employed.

A preferred liquid stabilizer system is added to the polyvinyl chloride resin in an amount to provide in the resin from about 0.1 to about 2% of the zinc chloride-organic triphosphite complex; from about 0.1 to about 2% of the thiophosphite containing at least one mercaptocarboxylic acid group; from about 0.1 to about 2% of the barium carbonate-barium alkyl phenate; from about 0.1 to about 1.5% of the calcium carboxylate salt; from about 0.2 to about 1% of the organic triphosphite; and from about 0 to about 1% total of one or more of the additional ingredients, as noted above.

The liquid stabilizer system is incorporated in the polymer in suitable mixing equipment, such as a mill or a Banbury mixer. If the polymer has a melt viscosity which is too high for the desired use, the polymer can be worked until its melt viscosity has been reduced to the desired range before addition of the stabilizer. Mixing is continued until the mixture is substantially uniform. The resulting composition is then removed from the mixing equipment and brought to the size and shape desired for marketing or use.

The stabilized polyvinyl chloride resin cam be worked into the desired shape, such as by milling, calendering, extrusion or injection molding, or fiber-forming. In such operations, it will be found to have a considerably improved resistance to discoloration and embrittlement on exposure to heat and light.

The following Examples illustrate preferred zinc chloride-organic triphosphite complexes and their preparation; and preferred liquid stabilizer systems of the invention:

EXAMPLE A

Into a 1000 ml flask was placed 480 gms of di-isodecyl phenyl phosphite. The flask was heated to 100° C. and 120 gms of technical grade zinc chloride added, with mixing. The mixing was continued for 4 hours; as the reaction proceeded, all the $ZnCl_2$ dissolved in the phosphite. At the end of the reaction, the percent of active Zn in the complex was determined to be 9.7% (theoretical %=9.58%).

EXAMPLE B

Into a 1000 ml flash was placed 560 gms of isodecyl diphenyl phosphite. The flask was heated to 100° C., and 140 gms of technical grade zinc chloride added, with mixing. The mixing was continued for 4 hours at 100°~110° C.; as the reaction proceeded, all the $ZnCl_2$ dissolved in the phosphite. At the end of the reaction, the percent of active Zn in the complex was determined to be 9.27% (theoretical %=9.58%).

EXAMPLE C

Into a 1000 ml flask was added 420 gms of di-isodecyl phenyl phosphite and 60 gms of butyl carbitol 2(2'-butoxyethoxy)ethanol. There was then mixed in $ZnCl_2$ and the mixture heated at 100°~110° C. until all the $ZnCl_2$ dissolved. The percent active Zn in the complex was 9.62%.

The following Examples represent preferred embodiments of polyvinyl chloride resin compositions containing stabilizer systems of the invention.

EXAMPLES 1 TO 4

A series of clear polyvinyl chloride resin compositions was prepared having the following formulation:

| Ingredients | Parts by Weight |
| --- | --- |
| Polyvinyl chloride homopolymer (Diamond 450) | 100 |
| Dioctyl phthalate | 40 |
| Epoxidized soybean oil (Drapex 6.8) | 5 |
| Stearic acid | 0.3 |
| Stabilizer system as identified in Table A | 2 |

TABLE A

| Stabilizers | Control A | I | II | III | IV |
| --- | --- | --- | --- | --- | --- |
| Ba octoate | 35.90 | 35.90 | 35.90 | 35.90 | 35.90 |
| Cd benzoate/tallate, 14% Cd | 15.65 | 15.65 | 15.65 | 15.65 | 15.65 |
| Zn octoate, 8.5% Zn solution | 6.33 | — | — | — | — |
| $ZnCl_2$/diisodecyl phenyl phosphite (Example A) | — | 6.33 | — | 5.38 | 4.00 |
| $ZnCl_2$/isodecyl diphenyl phosphite (Example B) | — | — | 6.33 | — | — |
| Isodecyldiphenyl phosphite | 22.00 | 22.00 | 22.00 | 22.00 | 22.00 |
| Diphenyl phosphite | 2.50 | 2.50 | 2.50 | — | 2.50 |
| Di-t-butyl-p-cresol | 2.00 | 2.00 | 2.00 | 2.00 | 2.00 |
| Alkylaromatic Hydrocarbon diluent | 15.62 | 15.62 | 15.62 | 19.07 | 17.95 |

The resin compositions were milled on a two-roll mill at 350° F. for 3 minutes, and then sheeted off. The milled sheets were cut into strips, which were then placed in an oven and heated at 375° F. (190° C.) until dark edges appeared on the samples. Samples of each were cut off from the strips at fifteen minute intervals, and placed on a card. The development of color in the course of the heating was characterized by numbers, according to the following tabulation, and is reported below in Table I.

TABLE I

| Color legend | | |
| --- | --- | --- |
| | 1 | clear |
| | 2 | slightly faint yellow |
| | 3 | light yellow |
| | 4 | yellow |
| | 5 | yellow with black edges |
| | 6 | dark yellow with black edges |
| | 7 | dark black |

| Time | Color | | | | |
| --- | --- | --- | --- | --- | --- |
| Example No.: | A | 1 | 2 | 3 | 4 |
| Resin Composition Containing Stabilizer System No.: | Control A | I | II | III | IV |
| After: 0 min. | 1 | 1 | 1 | 1 | 1 |
| 15 min. | 2 | 1+ | 1+ | 1 | 1+ |
| 30 min. | 3 | 2+ | 2+ | 2 | 2+ |
| 45 min. | 3 | 3 | 3 | 3 | 3 |
| 60 min. | 5 | 5 | 5 | 5 | 4 |
| 75 min. | 6 | 6 | 6 | 6 | 5 |
| 90 min. | 7 | 7 | 7 | 7 | 6 |

These results show that the use of a zinc chloride-triphosphite complex according to the invention imparts improved heat stability to the samples, as evidenced by lessened discoloration, especially in the first two test periods that most closely correlate with the heat history of industrial processing of polyvinyl chloride.

EXAMPLES 5 TO 8

A series of opaque filled polyvinyl chloride resin compositions was prepared, having the following formulation:

| Ingredients | Parts by Weight |
| --- | --- |
| Polyvinyl chloride homopolymer (Diamond 450) | 100 |
| Dioctyl phthalate | 50 |
| Calcium carbonate (Atomite) | 25 |
| Epoxidized soybean oil (Drapex 6.8) | 10 |
| Titanium dioxide $TiO_2$ | 3 |
| Stearic acid | 0.3 |
| Stabilizer system as shown in Table B | 3 |

TABLE B

| Stabilizer | Control B | V | VI | VII | VIII |
| --- | --- | --- | --- | --- | --- |
| Diisodecyl phenyl | 39.2 | 39.2 | 39.2 | 39.2 | 39.2 |

TABLE B-continued

| Stabilizer | Stabilizer Example No. | | | | |
|---|---|---|---|---|---|
| | Control B | V | VI | VII | VIII |
| phosphite | | | | | |
| Diphenyl phosphite | 3.76 | 3.76 | 3.76 | 3.76 | 3.76 |
| 1,1,3-tris-(5-tert-butyl-2-methyl-4-hydroxyphenyl) butane | 0.88 | 0.88 | 0.88 | 0.88 | 0.88 |
| Solution Cd benzoate-tallate (14% Cd) | 22.93 | 22.93 | 22.93 | 22.93 | 22.93 |
| Oleic acid | 0.88 | 0.88 | 0.88 | 0.88 | 0.88 |
| Basic Zn-2-ethyl hexoate | 3.63 | — | — | — | — |
| $ZnCl_2$/diisodecyl phenyl phosphite (Example A) | — | 8.16 | — | — | — |
| $ZnCl_2$/isodecyl phenyl phosphite (Example B) | — | — | 8.16 | 4.00 | 6.00 |
| Liquid $BaCO_3$—Ba nonylphenate | 18.62 | 18.62 | 18.62 | 18.62 | 18.62 |
| Hydrocarbon diluent | 10.10 | 5.57 | 5.57 | 9.73 | 7.73 |

The resin compositions were milled on a two-roll mill at 350° F. for 3 minutes, and then sheeted off. The milled sheets were cut into strips, which were then placed in an oven and heated at 375° F. (190° C.) until dark edges appeared on the samples. Samples of each were cut off from the strips at fifteen minute intervals, and placed on a card. The development of color in the course of the heating was characterized by numbers, according to the following tabulation, and is reported below in Table II.

TABLE II

| Color legend | 1 | white |
|---|---|---|
| | 2 | off-white |
| | 3 | faint yellow |
| | 4 | light yellow |
| | 5 | yellow |
| | 6 | yellow to light orange |
| | 7 | dark yellow |
| | 8 | dark yellow with black edges |

| Time | Color | | | | |
|---|---|---|---|---|---|
| Example No. Resin Composition Containing Stabilizer System No.: | Control B / B | 5 / V | 6 / VI | 7 / VII | 8 / VIII |
| After: 0 min. | 1 | 1 | 1 | 1 | 1 |
| 15 min. | 2 | 1+ | 1 | 1 | 1 |
| 30 min. | 2 | 2 | 2 | 2 | 2 |
| 45 min. | 3— | 3— | 3— | 2+ | 3 |
| 60 min. | 4 | 4 | 4 | 3 | 5 |
| 75 min. | 5 | 5 | 5 | 4 | 6 |
| 90 min. | 6 | 6 | 6 | 5 | 6 |
| 105 min. | 7 | 7 | 7 | 6 | 8— |
| 120 min. | 8 | 8 | 8— | 7 | 8+ |

These results show the improved heat stability imparted to these pigmented polyvinyl chloride compositions according to this invention by the zinc chloride-triphosphite combinations in Examples V to VIII.

EXAMPLE 9

A series of clear polyvinyl chloride resin compositions was prepared having the following formulation:

| Ingredients | Parts by Weight |
|---|---|
| Polyvinyl chloride homopolymer (Diamond 450) | 100 |
| Dioctyl phthalate | 40 |
| Epoxidized soybean oil | 5 |

| Ingredients | Parts by Weight |
|---|---|
| (Drapex 6.8) | |
| Stearic acid | 0.3 |
| Stabilizer system as identified in Table C | 2 |

TABLE C

| Stabilizer System No.: | Control C | IX |
|---|---|---|
| Ba nonyl phenate (12½% Ba) | 21.20 | — |
| Zn octoate (8½% Zn) | 21.20 | — |
| $ZnCl_2$/diisodecyl phenyl phosphite (Example A) | — | 15.0 |
| Isooctyl diphenyl phosphite | 42.6 | 52.0 |
| Hydrocarbon diluent | 15.0 | — |
| Liquid $BaCO_3$—Ba nonyl phenate | — | 20.0 |
| Diphenyl phosphite | — | 3.0 |
| Isodecyl alcohol | — | 10.0 |

The resin compositions were milled on a two-roll mill at 350° F. for 3 minutes, and then sheeted off. The milled sheets were cut into strips, which were then placed in an oven and heated at 375° F. (190° C.) until dark edges appeared on the samples. Samples of each were cut off from the strips at fifteen minute intervals, and placed on a card. The development of color in the course of the heating was characterized by numbers, according to the following tabulation, and is reported below in Table III.

TABLE III

| Color legend | 1 | clear |
|---|---|---|
| | 2 | slightly faint yellow |
| | 3 | light yellow |
| | 4 | yellow |
| | 5 | yellow with black edges |
| | 6 | dark yellow with black edges |
| | 7 | dark black |

| Time | Color | |
|---|---|---|
| Example No.: Resin Composition Containing Stabilizer System No.: | Control C / C | 9 / IX |
| After: 0 min. | 1 | 1 |
| 10 min. | 1 | 1 |
| 20 min. | 1+ | 1 |
| 30 min. | 2 | 1+ |
| 40 min. | 2 | 2 |
| 50 min. | 3 | 2 |
| 60 min. | 5 | 2 |
| 70 min. | 7 | 3 |

These results show the improved heat stability imparted to the barium-zinc stabilizer (i.e. cadmium-free) compositions according to this invention by the zinc chloride-triphosphite combination of Example IX.

EXAMPLES 10 TO 12

A series of clear polyvinyl chloride resin compositions were prepared, having the following formulation:

| Ingredients | Parts by Weight |
|---|---|
| Polyvinyl chloride homopolymer (Diamond 450) | 100 |
| Dioctyl phthalate | 40 |
| Epoxidized soybean oil | 5 |

-continued

| Ingredients | Parts by Weight |
|---|---|
| (Drapex 6.8) | |
| Stearic acid | 0.3 |
| Stabilizer system as identified in Table C, Examples C and IX | 1, 2 or 3 as indicated in Table IV |

The resin compositions were milled on a two-roll mill at 350° F. for 3 minutes and then sheeted off. The milled sheets were cut into strips which were then placed in an oven and heated at 375° F. (190° C.) until dark edges appeared on the samples. Samples of each were cutt off from the strips at fifteen minute intervals and placed on a card. The development of color in the course of the heating was characterized by numbers according to the following tabulation and are reported below in Table IV.

TABLE IV

| Color legend | 1 | clear |
|---|---|---|
| | 2 | slightly faint yellow |
| | 3 | light yellow |
| | 4 | yellow |
| | 5 | yellow with black edges |
| | 6 | dark yellow with black edges |
| | 7 | dark black |

| Time | Color | | | | | |
|---|---|---|---|---|---|---|
| Example No.: | Control D | 10 | Control E | 11 | Control F | 12 |
| Resin Composition Containing Stabilizer System No.: | C | IX | C | IX | C | IX |
| Amount: | 1 | 1 | 2 | 2 | 3 | 3 |
| After: 0 min. | 1 | 1 | 1 | 1 | 1 | 1 |
| 15 min. | 1 | 1 | 1 | 1 | 1 | 1 |
| 30 min. | 2 | 1+ | 1+ | 1+ | 1 | 1 |
| 45 min. | 3 | 2 | 3 | 2 | 2− | 2− |
| 60 min. | 4 | 3+ | 4 | 3 | 2 | 2 |
| 75 min. | 5 | 4 | 6 | 3 | 6 | 3 |
| 90 min. | 6 | 4+ | 7 | 4 | 7 | 3+ |
| 105 min. | 7 | 5 | 7+ | 5 | 7+ | 5 |
| 120 min. | 7+ | 6 | 7+ | 6 | 7+ | 6 |

These results illustrate a problem of long standing with conventional barium-zinc stabilizer compositions, which stabilizer compositions according to this invention are able to overcome. The conventional stabilizers of controls D, E and F are characterized by negative dose-response, meaning that increasing the use level of the stabilizer does not provide better stabilization; at best, improved early color control with higher use levels is counterbalanced by more severe discoloration on further heating. In contrast, the increase in use level of stabilizer system IV according to this invention from 1 to 2 and 3 parts in Examples 10, 11 and 12 provides a positive dose-response, i.e. improved stabilization with higher use level.

EXAMPLES 13 AND 14

A series of clear polyvinyl chloride resin compositions was prepared having the following formulation:

| Ingredients | Parts by Weight |
|---|---|
| Polyvinyl chloride homopolymer (Diamond 450) | 100 |
| Dioctyl phthalate | 40 |
| Epoxidized soybean oil (Drapex 6.8) | 5 |
| Stearic acid | 0.3 |

| Ingredients | Parts by Weight |
|---|---|
| Stabilizer system as identified in Table D | 2 |

TABLE D

| Stabilizer System No.: | D | E | X | XI |
|---|---|---|---|---|
| Isodecyl diphenyl phosphite | 17.70 | — | 38.0 | 40.0 |
| Diphenyl phosphite | 3.38 | 2.0 | 3.0 | — |
| Basic zinc 2-ethyl hexoate | 1.33 | 6.0 | — | — |
| Oleic acid | 0.62 | — | — | — |
| Cd benzoate-tallate solution (14% Cd) | 47.91 | — | — | — |
| Barium nonyl phenate | 28.76 | — | — | — |
| 4,4-Isopropylidene-bis (2,6-di-t-butyl phenol) mixed with related phenols | 0.30 | — | 4.0 | 4.0 |
| Liquid BaCO$_3$—Ba nonyl phenate solution | — | 18.0 | 27.0 | 28.0 |
| Cd benzoate-tallate | — | 16.0 | — | — |
| Diisodecyl phenyl phosphite | — | 50.0 | — | — |
| Di-tert-butyl-p-cresol | — | 2.0 | — | — |
| Hydrocarbon diluent | — | 6.0 | — | — |
| ZnCl$_2$/diisodecyl phenyl phosphite (Example A) | — | — | 18.0 | 18.0 |
| Tri(isooctyl thioglycolate) thiophosphite | — | — | 10.0 | 10.0 |

The resin compositions were milled on a two-roll mill at 350° F. for 3 minutes, and then sheeted off. The milled sheets were cut into strips, which were then placed in an oven and heated at 375° F. (190° C.) until dark edges appeared on the samples. Samples of each were cutt off from the strips at fifteen minute intervals, and placed on a card. The development of color in the course of the heating was characterized by numbers, according to the following tabulation, and is reported below in Table V.

TABLE V

| Color legend | 1 | clear |
|---|---|---|
| | 2 | slightly faint yellow |
| | 3 | light yellow |
| | 4 | yellow |
| | 5 | yellow with black edges |
| | 6 | dark yellow with black edges |
| | 7 | dark black |

| Time | Color | | | |
|---|---|---|---|---|
| Example No.: Resin Composition | Control G | Control H | 13 | 14 |

TABLE V-continued

| Containing Stabilizer System No.: | D | E | X | XI |
|---|---|---|---|---|
| After: 0 min. | 1 | 1 | 1 | 1 |
| 15 min. | 1 | 1 | 1+ | 1 |
| 30 min. | 1+ | 1+ | 1+ | 1+ |
| 45 min. | 2− | 2− | 2− | 2− |
| 60 min. | 2 | 2 | 2 | 3 |
| 75 min. | 3 | 3 | 3 | 3+ |
| 90 min. | 4 | 4 | 4 | 4 |
| 105 min. | 5 | 6 | 5 | 6− |
| 120 min. | 6 | 7 | 6− | 7 |

These results show that the cadmium-free-barium-zinc stabilizer compositions of Examples 13 and 14 are at least as good as the cadmium containing stabilizer compositions of Controls G and H. The latter represent commercial stabilizer formulations widely used in automobile interior plastic items. This is believed to be the first instance of achieving equivalent or better effectiveness of a cadmium-free stabilizer to a cadmium-containing stabilizer without requiring the use of additional epoxysoybean oil to compensate for diminished heat stability.

EXAMPLES 15 TO 20

A series of clear polyvinyl chloride resin compositions was prepared, having the following formulation:

| Ingredients | Parts by Weight |
|---|---|
| Polyvinyl chloride homopolymer (Diamond 450) | 100 |
| Dioctyl phthalate | 40 |
| Epoxidized soybean oil (Drapex 6.8) | 5 |
| Stearic acid | 0.3 |
| Stabilizer system as identified in Table E (based on Stabilizer System C of Table D) | 2 |

TABLE E

| Stabilizer System No.: | XII | XIII | XIV | XV | XVI | XVII |
|---|---|---|---|---|---|---|
| Isodecyl diphenyl phosphite | 38.0 | 38.0 | 38.0 | 38.0 | 38.0 | 38.0 |
| Diphenyl phosphite | 3.0 | 3.0 | 3.0 | 3.0 | 3.0 | 3.0 |
| 4,4-isopropylidene-bis-(2,6-di-tert-butyl phenol) | 4.0 | 4.0 | 4.0 | 4.0 | 4.0 | 4.0 |
| Liquid BaCO₃—Ba nonyl phenate | 27.0 | 27.0 | 27.0 | 27.0 | 27.0 | 27.0 |
| ZnCl₂/diisodecyl phenyl phosphite (Example A) | 18.0 | 18.0 | 18.0 | 18.0 | 18.0 | 18.0 |
| Isooctyl thioglycolate thiophosphite | — | 10.0 | — | — | — | — |
| Tri-2-ethylhexyl thioglycolate thiophosphite | — | — | 10.0 | — | — | — |
| Tri(thiododecyl) thiophosphite | — | — | — | 10.0 | — | — |
| ¹MEC₃ thiophosphite | — | — | — | — | 10.0 | — |
| Isooctyl thioglycolate | — | — | — | — | — | 10.0 |

¹Tri(thiophosphite) of 2-mercaptoethyl caprate

The resin compositions were milled on a two-roll mill at 350° F. for 3 minutes, and then sheeted off. The milled sheets were cut into strips, which were then placed in an oven and heated at 375° F. (190° C.) until dark edges appeared on the samples. Samples of each were cut off from the strips at fifteen minute intervals, and placed on a card. The development of color in the course of the heating was characterized by numbers, according to the following tabulation, and are reported below in Table VI.

TABLE VI

| Color legend | | |
|---|---|---|
| | 1 | clear |
| | 2 | slightly faint yellow |
| | 3 | light yellow |
| | 4 | yellow |
| | 5 | yellow with black edges |
| | 6 | dark yellow with black edges |
| | 7 | dark black |

| Time | Color | | | | | |
|---|---|---|---|---|---|---|
| Example No.: | 15 | 16 | 17 | 18 | 19 | 20 |
| Resin Composition Containing Stabilizer System No.: | XII | XIII | XIV | XV | XVI | XVII |
| After: 0 min. | 1 | 1 | 1 | 1 | 1 | 1 |
| 15 min. | 2 | 1 | 1+ | 2− | 1+ | 1+ |
| 30 min. | 2 | 1 | 2 | 2 | 2 | 2 |
| 45 min. | 2+ | 1+ | 2+ | 2+ | 2+ | 2+ |
| 60 min. | 3 | 2 | 3 | 3 | 3 | 3+ |
| 75 min. | 4 | 3 | 3+ | 4 | 4+ | 4+ |
| 90 min. | 6 | 4 | 4+ | 5 | 5+ | 5 |
| 105 min. | 7 | 5 | 6 | 7 | 7 | 7 |
| 120 min. | 7+ | 7 | 7 | 7+ | 7+ | 7+ |

These results show the improvement imparted to stabilizers containing a zinc chloride-triphosphite combination by various sulfur compounds. The triphosphites used in stabilizer compositions XIII and XIV are clearly superior to isooctyl thioglycolate (the starting material for the trithiophosphite of Example XIII) and to trithiophosphites lacking the mercaptocarboxylic acid structure, as in stabilizer compositions XV and XVI.

EXAMPLES 21 TO 24

A series of clear polyvinyl chloride resin compositions was prepared, having the following formulation:

| Ingredients | Parts by Weight |
|---|---|
| Polyvinyl chloride homopolymer (Diamond 450) | 100 |
| Dioctyl phthalate | 40 |
| Epoxidized soybean oil (Drapex 6.8) | 5 |

-continued

| Ingredients | Parts by Weight |
|---|---|
| Stearic acid | 0.3 |
| Stabilizer system as identified in Table F | 2 |

TABLE F

| Stabilizer System No.: | XVIII | XIX | XX | XXI | F |
|---|---|---|---|---|---|
| Diisodecyl phenyl phosphite | 40 | 40 | 33 | 36 | 36 |
| Tri(isooctyl thioglycolate) thiophosphite | 10 | 10 | 10 | 10 | 10 |
| Diphenyl phosphite | 4 | 4 | 4 | 4 | 4 |
| 4,4-isopropylidene bis(2,6-di-tert-butyl phenol) | 4 | 4 | 4 | 4 | 4 |
| Liquid BaCO$_3$— Ba nonyl phenate | 28 | 28 | 28 | 28 | 28 |
| Cd benzoate tallate | — | — | 7 | 7 | — |
| Zn-octoate (8.5% Zn) | — | 9 | — | — | 22 |
| ZnCl$_2$/diisodecyl phenyl phosphite (Example A) | 18 | 9 | 18 | 15 | — |

The resin compositions were milled on a two-roll mill at 350° F. for 3 minutes, and then sheeted off. The milled sheets were cut into strips, which were then placed in an oven and heated at 375° F. (190° C.) until dark edges appeared on the samples. Samples of each were cut off from the strips at fifteen minute intervals, and placed on a card. The development of color in the course of the heating was characterized by numbers, according to the following tabulation, and are reported below in Table VII.

TABLE VII

| Color legend | 1 | clear |
|---|---|---|
| | 2 | slightly faint yellow |
| | 3 | light yellow |
| | 4 | yellow |
| | 5 | yellow with black edges |
| | 6 | dark yellow with black edges |
| | 7 | dark black |

| Time | | | Color | | |
|---|---|---|---|---|---|
| Example No.: | 21 | 22 | 23 | 24 | Control I |
| Resin Composition Containing Stabilizer System No.: | XVIII | XIX | XX | XXI | F |
| After: 0 min. | 1 | 1 | 1 | 1 | 1 |
| 15 min. | 1+ | 1+ | 1 | 1 | 2 |
| 30 min. | 2 | 2+ | 2 | 2 | 3 |
| 45 min. | 3 | 3 | 2+ | 2+ | 3 |
| 60 min. | 3+ | 3+ | 3— | 3 | 3+ |
| 75 min. | 4 | 4 | 4— | 4— | 4+ |
| 90 min. | 4+ | 4+ | 4 | 4 | 4+ |
| 105 min. | 5 | 4+ | 4 | 4+ | 5— |
| 120 min. | 6 | 6 | 6 | 6 | 6 |

These results illustrate, first, the enhanced effectiveness of a trithiophosphite when used together with a barium-zinc stabilizer containing zinc chloride-triphosphite combination according to this invention (compare Control I to Examples 21 and 22) and second, the unexpected finding that compositions containing a trithiophosphite according to this invention can be used together with a cadmium salt without "sulfide staining" or other adverse effects.

Having regard to the foregoing disclosure, the following is claimed as the inventive and patentable embodiments thereof:

1. A zinc chloride-organic triphosphite complex having the formula:

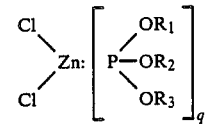

wherein:
R$_1$, R$_2$ and R$_3$ are selected from the group consisting of alkyl having from one to about eighteen carbon atoms; alkenyl having from one to about eighteen carbon atoms; cycloalkyl having from three to about twelve carbon atoms; alkylaryl having from seven to about twenty-four carbon atoms; and aryl having from six to ten carbon atoms; and q is a number representing the number of phosphite groups per zinc chloride group, and is selected from 0.5, 1 and 2, the organic triphosphite of the zinc chloride-organic triphosphite complex being a liquid over the temperature range from about −10° C. up to about 200° C.

2. A zinc chloride-organic triphosphite complex according to claim 1 in which the organic triphosphite is an alkyl aryl phosphite.

3. A zinc chloride-organic triphosphite complex according to claim 1 in which the organic triphosphite is di(isodecyl)phenyl phosphite.

4. A zinc chloride-organic triphosphite complex according to claim 1 in which the organic triphosphite is isodecyl diphenyl phosphite.

5. A zinc chloride-organic triphosphite complex according to claim 1 in which q is 1.

6. A zinc chloride-organic triphosphite complex according to claim 1 in which q is 0.5.

7. A zinc chloride-organic triphosphite complex according to claim 1 in which q is 2.

8. A homogeneous liquid stabilizer system for polyvinyl chloride resins consisting essentially of:
(1) a zinc chloride-organic triphosphite complex having the formula:

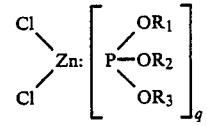

wherein:
R$_1$, R$_2$ and R$_3$ are selected from the group consisting of alkyl having from one to about eighteen carbon atoms; alkenyl having from one to about eighteen carbon atoms; cycloalkyl having from three to about twelve carbon atoms; alkylaryl having from seven to about twenty-four carbon atoms; and aryl having from six to ten carbon atoms; and q is a number representing the number of phosphite groups per zinc chloride group, and ranges from 0.3 to about 3; and (2) at least one polyvinyl chloride resin stabilizer selected from the group consisting of:
(a) organic thiophosphites;
(b) barium carbonate-alkyl phenate complexes;
(c) barium, cadmium, zinc and calcium salts of carboxylic acids;
(d) phenolic antioxidants;
(e) organic triphosphites; and (f) organic acid phosphites.

9. A stabilizer system according to claim 8 comprising an organic thiophosphite having the formula:

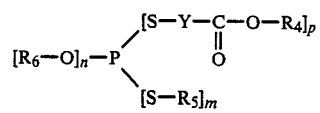

wherein:
p is a number from 1 to 3;
n is a number from 0 to 2;
m is a number from 0 to 2;
and the sum of n+m+p is 3;
Y is straight or branched chain alkylene having from one to about twelve carbon atoms;
$R_4$, $R_5$ and $R_6$ are selected from the group consisting of alkyl having from one to about eighteen carbon atoms; cycloalkyl having from three to about twelve carbon atoms; and alkylaryl having from seven to about twenty-four carbon atoms.

10. A stabilizer system according to claim 9 in which the thiophosphite is a tri(mercaptocarboxylic acid ester) phosphite.

11. A stabilizer system according to claim 8 comprising a liquid barium carbonate-alkyl phenate.

12. A stabilizer system according to claim 11 in which the barium carbonate alkyl phenate comprises barium carbonate combined with at least one barium alkyl phenate in a nonvolatile organic liquid which acts as a liquefying agent for the carbonate.

13. A stabilizer system according to claim 12 in which the organic liquid is selected from the group consisting of hydrocarbon oils, plasticizers, epoxy esters, and mixtures thereof.

14. A stabilizer system according to claim 11 in which the metal ratio of barium carbonate to barium alkyl phenate is a number within the range from 2 to 20.

15. A stabilizer system according to claim 11 in which the alkyl phenate residue of the barium alkyl phenate has at least ten up to about one hundred fifty carbon atoms.

16. A stabilizer system according to claim 11 in which the ratio of total barium to the organic moiety in the barium carbonate-barium alkyl phenate is greater than the stoichiometric ratio of the neutral barium alkyl phenate.

17. A stabilizer system according to claim 16 in which the barium carbonate-barium alkyl phenate is barium carbonate-barium dodecyl phenate containing from 23 to 29% Ba.

18. A stabilizer system according to claim 8 in which the organic triphosphite of the zinc chloride-organic triphosphite complex is a liquid over the temperature range from about −10° C. up to about 200° C.

19. A stabilizer system according to claim 8 comprising a liquid organic triphosphite defined by the formula:

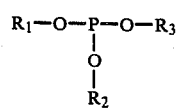

in which
$R_1$, $R_2$ and $R_3$ are selected from the group consisting of alkyl, alkenyl, aryl, alkaryl, aralkyl, and cycloalkyl groups having from one to about fifty carbon atoms.

20. A stabilizer system according to claim 8 comprising a liquid organic triphosphite defined by the formula:

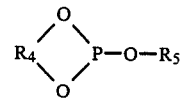

in which
$R_4$ is a bivalent organic radical selected from the group consisting of alkylene, arylene, aralkylene, alkarylene and cycloalkylene radicals having from two to about thirty carbon atoms, and $R_5$ is a monovalent organic radical selected from the group consisting of alkyl, alkenyl, aryl, alkaryl, aralkyl, and cycloalkyl groups having from one to about thirty carbon atoms.

21. A stabilizer system according to claim 8 comprising a liquid organic triphosphite defined by the formula:

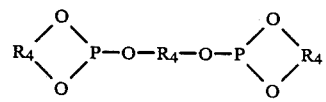

in which
$R_4$ is a bivalent organic radical selected from the group consisting of alkylene, arylene, aralkylene, alkarylene and cycloalkylene radicals having from two to about thirty carbon atoms.

22. A stabilizer system according to claim 9 comprising a liquid organic triphosphite defined by the formula:

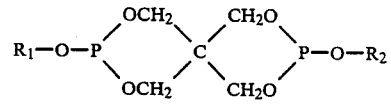

where $R_1$ and $R_2$ are selected from the group consisting of aryl, alkyl, aryloxyethyl, alkyloxyethyl, aryloxyethoxyethyl, alkyloxyethoxyethyl and alkyloxypolyethoxyethyl having from about one to about thirty carbon atoms.

23. A stabilizer system according to claim 8 comprising a liquid organic acid phosphite.

24. A stabilizer system according to claim 23 in which the acid phosphite is defined by the formula:

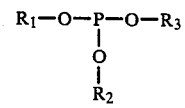

in which:
$R_1$, $R_2$ and $R_3$ are selected from the group consisting of hydrogen, alkyl, alkenyl, aryl, alkaryl, aralkyl, and cycloalkyl groups having from one to about thirty carbon atoms, and at lest one to two of $R_1$, $R_2$ and $R_3$ is hydrogen.

25. A stabilizer system according to claim 8 comprising a phenolic antioxidant.

26. A stabilizer system according to claim 25 in which the phenolic antioxidant has at lest one phenolic hydroxyl group, at least one phenolic nucleus, and from about eight to about three hundred carbon atoms.

27. A stabilizer system according to claim 25 in which the phenolic antioxidant is a monocyclic phenol having the structure:

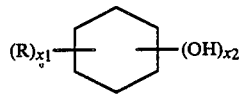

wherein
R is selected from the group consisting of hydrogen; halogen, and organic radicals containing from one to about thirty carbon atoms selected from the group consisting of alkyl, aryl, alkenyl, alkaryl, aralkyl, cycloalkenyl, cycloalkyl, alkoxy, and

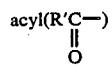

where
R' is aryl, alkyl or cycloalkyl;
$x_1$ and $x_2$ are integers from one to four, and the sum of $x_1$ and $x_2$ does not exceed six.

28. A stabilizer system according to claim 25 in which the antioxidant has the formula:

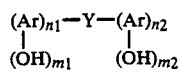

wherein
Y is a polyvalent linking group selected from the group consisting of oxygen; carbonyl; aromatic, aliphatic and cycloaliphatic hydrocarbon groups and oxyhydrocarbon groups having from one up to twenty carbon atoms;
Ar is a phenolic nucleus containing at least one free phenolic hydroxyl group up to a total of five;
$m_1$ and $m_2$ are numbers from one to five, and
$n_1$ and $n_2$ are numbers from one to four.

29. A stabilizer system according to claim 28 in which Ar is a benzene nucleus.

30. A stabilizer system according to claim 8 comprising a calcium salt of a carboxylic acid selected from the group consisting of branched chain aliphatic carboxylic acids having from about five to about thirteen carbon atoms; aromatic carboxylic acids having from about seven to about eleven carbon atoms; and unsaturated aliphatic carboxylic acids having from about twelve to about twenty-two carbons.

31. A stabilizer system according to claim 8 comprising a blend of:
(a) zinc chloride-organic triphosphite complex in an amount within the range from about 20 to about 40 parts by weight;
(b) organic thiophosphite in an amount within the range from about 20 to about 40 parts by weight;
(c) barium carbonate-barium alkyl phenate in an amount within the range from about 20 to about 40 parts by weight;
(d) organic triphosphite in an amount within the range from about 25 to about 45 parts by weight.

32. A stabilizer system according to claim 31 comprising at least one member of the group consisting of:
(a) barium, cadmium, zinc or calcium carboxylate in an amount within the range from about 1 to about 10 parts by weight;
(b) phenolic antioxidant in an amount within the range from about 0.01 to about 1 part by weight; and
(c) acid phosphite in an amount within the range from about 0.5 about 5 parts by weight.

33. A polyvinyl chloride resin composition having improved resistance to deterioration when heated at 350° F., comprising a polyvinyl chloride resin formed at least in part of the recurring group:

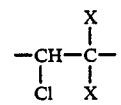

and having a chlorine content in excess of 40%, where X is either hydrogen or chlorine; and an amount to enhance the resistance to deterioration of the resin of a stabilizer system according to claim 8.

34. A polyvinyl chloride resin composition in accordance with claim 33 in which the polyvinyl chloride resin is polyvinyl chloride homopolymer.

35. A polyvinyl chloride resin composition in accordance with claim 33 in which the polyvinyl chloride resin is a copolymer of vinyl chloride and vinyl acetate.

36. A polyvinyl chloride resin composition having improved resistance to deterioration when heated at 350° F., comprising a polyvinyl chloride resin formed at least in part of the recurring group:

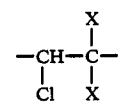

and having a chlorine content in excess of 40%, where X is either hydrogen or chlorine; and an amount to enhance the resistance to deterioration of the resin of a stabilizer composition according to claim 9.

37. A polyvinyl chloride resin composition having improved resistance to deterioration when heated at 350° F., comprising a polyvinyl chloride resin formed at least in part of the recurring group:

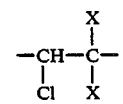

and having a chlorine content in excess of 40%, where X is either hydrogen or chlorine; and an amount to enhance the resistance to deterioration of the resin of a stabilizer system according to claim 11.

38. A polyvinyl chloride resin composition having improved resistance to deterioration when heated at 350° F., comprising a polyvinyl chloride resin formed at least in part of the recurring group:

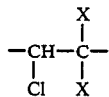

and having a chlorine content in excess of 40%, where X is either hydrogen or chlorine; and an amount to enhance the resistance to deterioration of the resin of a stabilizer system according to claim 19.

39. A polyvinyl chloride resin composition having improved resistance to deterioration when heated at 350° F., comprising a polyvinyl chloride resin formed at least in part of the recurring group:

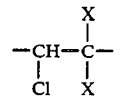

and having a chlorine content in excess of 40%, where X is either hydrogen or chlorine; and an amount to enhance the resistance to deterioration of the resin of a stabilizer composition according to claim 33.

40. A polyvinyl chloride resin composition having improved resistance to deterioration when heated at 350° F., comprising a polyvinyl chloride resin formed at least in part of the recurring group:

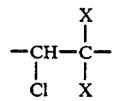

and having a chlorine content in excess of 40%, where X is either hydrogen or chlorine; and an amount to enhance the resistance to deterioration of the resin of a zinc chloride-organic triphosphite complex according to claim 25.

* * * * *